ELECTRIC CONTACT CONVERTERS

Original Filed March 25, 1952 8 Sheets-Sheet 1

ELECTRIC CONTACT CONVERTERS

Original Filed March 25, 1952 8 Sheets-Sheet 3

ELECTRIC CONTACT CONVERTERS

Original Filed March 25, 1952 8 Sheets-Sheet 4

ELECTRIC CONTACT CONVERTERS

Original Filed March 25, 1952 8 Sheets-Sheet 5

ELECTRIC CONTACT CONVERTERS

Original Filed March 25, 1952 8 Sheets-Sheet 6

ELECTRIC CONTACT CONVERTERS

Original Filed March 25, 1952 8 Sheets-Sheet 7

Inventor:
Erich Rolf

United States Patent Office

Re. 24,456
Reissued Apr. 8, 1958

24,456

ELECTRIC CONTACT CONVERTERS

Erich Rolf, Nurnberg, Germany, assignor to Siemens-Schuckertwerke Aktiengesellschaft, Berlin-Siemensstadt, Germany, a German corporation Original No. 2,756,381, dated July 24, 1956, Serial No. 278,385, March 25, 1952. Application for reissue June 20, 1957, Serial No. 668,011

Claims priority, application Germany March 30, 1951

50 Claims. (Cl. 321—48)

My invention relates to electric contact converters whose synchronous contact devices are series connected with saturable commutating reactors serving to temporarily minimize the instantaneous current during a recurrent interval of time within which the contact devices may open without sparking.

In such converters, the contact devices are either actuated by a synchronous motor energized from the alternating-current supply, or they are controlled by electromagnetic means. In the former case, the recurrent closing moments of the converter contacts are generally adjustable relative to the alternating-current cycle to permit regulating the converter output voltage in accordance with the delayed-commutation method. In contrast thereto, the opening moment of the electro-magnetically controlled contacts occurs always at the zero passage of the contact current, thus automatically adapting itself to the duration of the natural current-conducting interval of the contact within each cycle period.

In one type of magnetically controlled contact converters, the movable contact armature is held in the opening or closing position by means of permanent magnets; and the closing or opening movement of the contact is controlled by current pulses which temporarily counteract the holding force of the permanent magnet to let the movable contact armature swing to its other position (pulse-controlled switches). In another type of magnetically controlled contact converters the contact current itself takes care of electromagnetically holding the armature in the closing position. During closing, and in some cases also during opening performance, the contact current is replaced or aided in this operation by an auxiliary current flowing through an electric valve circuit across the contact gap, or/and by current pulses that occur at the proper moment (load-current controlled switches).

In all mentioned contact converters, the series-connected commutation reactors have a high reactance only temporarily during the commutation intervals when the magnetic flux in the reactor core changes between oppositely directed saturation values, while the reactance is negligibly small at all other times when the core is saturated. As a result, the reactor depresses the current to small instantaneous current values in the neighborhood of a current zero passage thus flattening the current wave to a step of a very small residual current magnitude (step current). Referring to the customary power line frequencies of 50 or 60 C. P. S., the step interval may last some tenths of one millisecond in magnetically controlled converters, and about 1 to 2 milliseconds in motor-actuated converters. To have the opening of the contact occur practically without any transfer of contact material, the step current flowing during the step interval through the contact at the opening moment should be as close as possible to zero or should, in any event, not exceed a few tenths of one ampere. Since the natural magnitude of the step current, which represents the magnetizing current of the commutating reactor, lies considerably above this limit especially with converters of large power ratings, it is an important problem in the design of contact converters to satisfy the requirement for a practically current-free contact opening operation for all occurring variations in load conditions. For this purpose, a suitable premagnetization may be applied to the commutation reactor. However the premagnetizing circuit means heretofore known leave much to de desired and solve this problem only within certain limits.

It is therefore an object of my invention to provide a contact converter with premagnetizing circuit means for the pertaining commutating reactor which afford an automatic adaptation of the premagnetizing flux in the reactor under all possible operating conditions so that the contact current is always practically zero at the opening moment.

The invention is based upon the concept of making the premagnetization of the commutating reactor dependent upon the voltage which obtains between the terminal of the pertaining transformer winding and the converter load and hence is effective across the series connection of commutating reactor and converter contact. This particular voltage is identical with the voltage $e_D$ that during the current step is impressed across the commutating reactor and thus determines the premagnetizing velocity $dB/dt$ of the reactor in accordance with the equation:

$$e_D = -w.q.\frac{dB}{dt}$$

In this equation, $w$ is the number of turns of the reactance winding (main winding) of the reactor, $q$ the iron cross section of the reactor core, and B is the magnetic inductance, while $t$ denotes time. The coercive force $H_c$ of the reactor iron, being a measure for the magnitude of the natural step current $i_c$ of the reactor, is a function of the magnetizing velocity $dB/dt$ and hence of the proportional reactor voltage $e_D$, as is apparent from the coordinate diagram shown in Fig. 1. Starting from the static value $H_s$ for $dB/dt=0$, the curve of the coercive force $H_c$ rises at first rather steeply and then enters into a much flatter and nearly linear portion at a still relatively small value of the premagnetizing velocity $dB/dt$. Such a course applies not only to the coercive force, i. e. to the flank midportion of the hysteresis loop ($B=0$), but also to other field-strength values along the flank of the hysteresis loop, particularly when the shape of the flank is flattened by a shaping circuit so that the flank extends approximately parallel to the ordinate axis. Such flattening or shaping circuits, known as such, consist of the series connection of a capacitor with an ohmic resistor or/and a damped oscillatory circuit, and are connected either directly across the reactor main winding or across an auxiliary winding on the reactor core (see 17 in Figs. 2, 4, 5, 14, 16 to 18). Such an improvement of the loop shape by means of shaping circuits also results in producing a practically horizontal course of the current step. If under these conditions the step current, flowing through the contact during the step interval, is to be reduced to zero, then the natural step current $i_c$ for any occurring value of the voltage $e_D$ must be compensated by a premagnetizing current $i_v$ that satisfies the condition:

$$i_v = i_c \cdot \frac{w}{w_v}$$

wherein $w_v$ denotes the number of turns of the premagnetizing winding. The premagnetizing current $i_v$ therefore must be made dependent upon the premagnetizing velocity corresponding to the curve of Fig. 1 or to a similar mathematic function. In most cases the bent portion of the curve, applying to small values of premagnetizing velocity, need not be considered because such small velocity values do not normally occur within the interval of time during which the contact opening may take place. The required dependence, therefore, is practically attained if the curve of Fig. 1 is substituted by a straight line approximately corresponding to the upper curve branch whose extrapolation, shown in Fig. 1 by a broken line, intersects the ordinate at the base of value $H_0$.

According to a more specific feature of my invention, therefore, the total premagnetization of the commutating reactors is composed of two superimposed components of which one is constant during the step interval while the other varies in dependence upon the voltage obtaining during the step interval across the commutating reactor. It is particularly advantageous to have the constant component correspond to the base value $H_0$ (Fig. 1) and to make the voltage-responsive component proportional to the reactor voltage $e_D$ so that it corresponds to the value $H_e$ in Fig. 1. This secures the most favorable operating condition. The constant component is supplied, for instance, by a premagnetization with direct current which may be inductively stabilized against transformer reaction of the reactor main winding. The voltage-responsive component, however, is supplied by a premagnetizing winding which is connected between the winding terminal of the pertaining power-supply transformer and the direct-current side of the converter contact and which therefore carries a current proportional to the voltage effective between these two connection points. The coaction of both premagnetizing components (magnetomotive forces) results in the desired dependence of the total reactor premagnetization upon the premagnetizing velocity, corresponding to the upper curve portion in Fig. 1.

This effect is not predicated upon any condition as regards magnitude and time dependency of the voltage across the reactor. Consequently, the device adapts itself automatically to all occurring conditions of converter operation. This automatic adaptation also takes care of compensating for voltage fluctuations of the alternating-current supply line as well as for any intentional or desired voltage changes as may be caused by transformer-tap switching or by the operation of any other voltage regulating or control means. Besides, the power losses in the premagnetizing circuits are smaller than with the known premagnetizing circuits in which the premagnetizing winding of the reactor are excited through a resistor by a voltage composed of the cross-phase transformer voltage and an additional series voltage. It will be recognized that by virtue of the reactor premagnetization according to the invention, the converter contacts open practically without current and without voltage at the end of their current-conducting periods regardless of any changes in converter operation.

According to another object, my invention also aims at improving the current-step conditions (make step) prevailing at the time of the contact closing operations. To this end, and in accordance with another feature of my invention, the premagnetization of the commutating reactor at the time of the make operation (make premagnetization) is also composed of two component electromotive forces of which one remains constant during the make step interval while the other varies in dependence upon the voltage across the series connection of converter contact and commutating reactor. This affords having the contacts close practically without current and without voltage at the beginning of their respective current-conducting periods.

The constant component of the make premagnetization may be produced by passing a direct current through an auxiliary reactor winding as described above with reference to the break premagnetization. However, while the direct-current flux of the auxiliary winding for the break premagnetization has a magnetizing direction opposed to that of the reactor main winding, the magnetizing direction of the auxiliary winding for the make premagnetization must have the same magnetizing sense as the main winding and may require a current magnitude different from that applied to the break premagnetization winding.

Further problems arise in special cases, for instance, when the rectified voltage delivered by the converter is to be controlled or regulated by the mechanical commutation-delay method, i. e. by delaying the contact closing moment a desired control angle relative to the zero passage of the alternating voltage. When the contact closing moment is thus delayed, the commutating reactor, under the effect of the positively directed alternating voltage, may be premagnetized up to saturation already prior to the closing moment. The make step would then be terminated ahead of the contact closing moment and would no longer be available for its intended purpose of initially preventing the contact current from rapidly rising immediately upon the initial closing touch of the contact. Besides, when a single commutating reactor serves to produce the make step as well as the break step, a break premagnetization with direct current would have the wrong direction for the make operation. It is, therefore, also among the objects of my invention to obviate these various difficulties. To this end, and in accordance with further features of my invention, the following means are applicable.

To make certain that, when providing a single commutating reactor, the constant component of premagnetization has the required direction during the make performance as well as during the break performance, this component is preferably applied as a premagnetizing magnetomotive force of alternating direction. This magnetomotive force, particularly for reacting requirements, may have a rectangular or trapezoidal wave shape. In certain cases, especially for moderate requirements such as a small rated power and a small regulating range, it is also possible to supply the constant component as a sinusoidal current, it being understood that this current has a single given polarity during each of the respective make and break step intervals. The rectangular or trapezoidal wave shapes may be produced in the known mannre by distorting an originally sinusoidal current with the aid of series connected saturable reactors (transductors) magnetically excited by direct current. Another suitable way of providing currents of trapezoidal wave shape is to supply them as the anode or transformer currents in a rectifier circuit connection. It is also possible and may become necessary to give the constant component of premagnetization during the break step a magnitude different from that effective during make performance. This can simply be obtained by means of an additional direct-current premagnetization of the reactor core. When employing transductors for producing the trapezoidal current, the direct current for the excitation of the transductor reactors may simply be passed through an additional winding on the core of the commutating reactor.

To permit, in addition to maximum-voltage adjustment of the current converter (zero delay angle), also a voltage regulation by delay-angle control (delayed-commutation method), the effectiveness of the voltage-responsive component or also of the constant component, or of both components of the make premagnetization is delayed to such a degree that the make step can only commence immediately after the contact closing moment or so shortly ahead of this moment that after the closing moment a still sufficient portion of the make step remains available for the temporary suppression of the current rise.

The desired delay in the initiation of one or both premagnetizing components may be effected by a controllable valve, for instance, a grid controlled gaseous or vaporous discharge device. Especially suitable for this purpose is a cesium vapor discharge device tube because of its small arc drop voltage. The delay in voltage inception may also be magnetically produced, for instance, by a so called valve reactor consisting of a series connection of a direct-current excited saturable reactor with an electric valve preferably of the two-electrode type (transductor or magnetic amplifier). In both cases the initiation of the excitation current must be placed into the proper time relation to the closing moment of the converter contact. In contact converters with motor-driven contacts, the driven contact member or a separate preclosing contact, for instance, may serve to supply the grid of the controllable valve with a positive control pulse for igniting the valve. In current converters with electromagnetically actuated contacts, the ignition pulse for the controllable valve in the premagnetizing circuit may be made dependent upon the pulse for controlling the closing operation of the converter contact.

Another way of controlling the delay in inception of the premagnetizing current is available in converters whose contacts are controlled electromagnetically by a separate control circuit of the type described and claimed in the copending application of E. Rolf and M. Belamin, Serial No. 278,386, filed March 25, 1952, and assigned to the assignee of the present invention. Such a separate control circuit, being galvanically, inductively or capacitively coupled with the main converter circuit and containing a current control device such as a grid-controlled tube or a variably excited transductor, operates to impart a controllable delay to the contact closing operation; and according to a feature of the present invention may simultaneously serve for controlling the initiation of the premagnetizing current for the commutating reactor.

For reliable converter performance, it is important to have the commutating reactor in condition for break performance during the predominant portion of each alternating-voltage cycle period. In contrast, the reactor need be prepared for make performance only during a small portion of the period, this portion being determined by the particular circuit scheme of the converter plant and by the range of voltage regulation to be effected by delayed-commutation control. For this reason the break premagnetization according to the invention is given predominance. That is, the duration of the make premagnetization within the alternating-voltage period is kept shorter than the duration of the break premagnetization.

The foregoing and other objects, advantages and features of my invention will be apparent from, or will be referred to in, the following description of the embodiments of the invention exemplified by the drawings, in which:

Fig. 1, explained above, is a coordinate diagram concerning the magnetic behavior of a commutating reactor in a contact converter;

Figs. 16, 16*a*, 16*b*, 17 and 18 are schematic circuit diagrams of respective further modifications of contact converters.

In all illustrations the same reference characters are used for denoting respectively similar elements or magnitudes.

Figure 2:
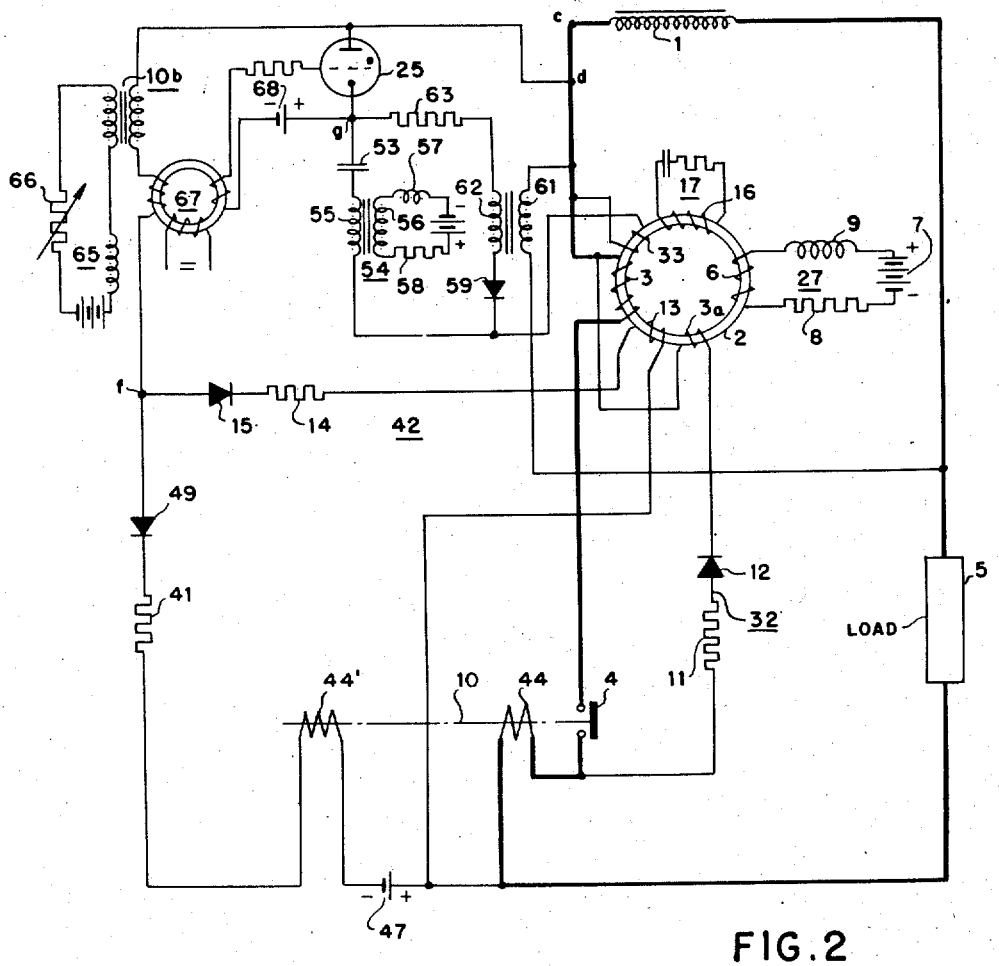
Fig. 2 is a schematic single-phase circuit diagram of a contact converter.

The single-phase converter circuit shown in Fig. 2 includes, as its alternating-voltage source, the secondary winding 1 of a power transformer energized from an alternating-current supply line. Series-connected in the circuit are the main winding 3 of a saturable commutating reactor 2, a synchronous contact device 4 having a movable contact element engageable with two stationary contact elements, and a direct-current load 5. The contact device 4 will hereinafter be briefly referred to as the "contact." The contact is actuated to open and close in synchronism with the wave of the alternating voltage and to this end is driven by a suitable means schematically indicated by a broken line 10. This drive means, as illustrated, comprises a control magnet with a holding coil 44 and a control coil 44'. The holding coil 44 is series connected in the main circuit of contact 4 and reactor winding 3 to be energized by the contact current. It need not be inserted at the particular place shown in Fig. 2 but may instead be connected at another place of the contact-controlled phase circuit, for instance, between the circuit points *c* and *d*.

It should be understood that converters according to the invention may have contact controlling or actuating means other than that shown in Fig. 2. For instance, the actuating means 10 may also consist of a cam shaft driven from a synchronous motor energized from transformer winding 1 through a phase shift transformer.

As explained, the commutating reactor, due to the reversal of the magnetization of its saturable core, produces during each cycle period a step in the current wave during which the contact 4 may open without sparking. For improving the shape of the current step, the reactor is linked with an auxiliary shaping circuit 17 comprising an auxiliary coil 16 on the reactor core in connection with a combination of capacitance and resistance, with or without inductance. In its simplest case, for instance, the circuit of coil 16 may essentially be composed of a capacitor and a calibrating resistor, as illustrated.

As explained in the foregoing, my invention requires applying to the commutating reactor a premagnetization comprising a constant component and a variable component of which the latter is dependent upon the voltage across the series connection of the main reactor winding and the converter contact. According to Fig. 2, the constant component of the break premagnetization is applied to the reactor 2 by means of an auxiliary winding 6 which is disposed on the saturable reactor core and energized from any suitable source 7 of direct voltage, such as a battery, through a smoothing and stabilizing reactor 9 and through an adjusting or calibrating resistor 8. This constant-component circuit as a whole is denoted by 27. The magnetomotive force produced by this circuit in the reactor 2 is determined by the constant ampere turns of auxiliary winding 6. The voltage-responsive component of the break premagnetization is applied by the reactor by an auxiliary winding **3*a* on the reactor core. Winding 3*a* lies in a premagnetizing circuit 32 which extends across the series connection of the converter contact 4 and the reactor main winding 3 and which includes an adjusting or calibrating resistor 11 in series with a valve 12. The electromotive force produced by circuit 32 in reactor 2 is variable in accordance with the variable ampere turns of auxiliary winding 3***a*.

The two component electromotive forces of the break premagnetization oppose the magnetization of the reactor core by the load current flowing through reactor winding 3. When these two premagnetizing components are alone effective, the commutating reactor is always in condition for sparkless break operation. The preparation for the make operation, however, represents a temporary exception from this general condition and takes place only when, during the normal course of the voltage wave, the conditions are just suitable for contact closing, that is, when there is a voltage capable of driving the current in the desired direction through the converter contact 4. For this purpose the constant component of the make premagnetization in the converter according to Fig. 2 is produced by means of an auxiliary circuit 52 in conjunction with automatically operating devices which vary the phase position of this premagnetizing component relative to the energizing alternating voltage in dependence upon the closing moment. This automatic phase shift device consists essentially of the series connection of a capacitor 53 with the working winding 55 of a transductor 54 to which a charging circuit and a discharging circuit are connected. The charging circuit comprises an half-wave rectifier 59, a current-limiting resistor 63 and the secondary winding 62 of an auxiliary transformer whose primary 61 is connected to the energizing alternating voltage of the power transformer winding 1. The discharge circuit is formed by an auxiliary circuit 52 which includes an auxiliary winding 33 on the core of the commutating reactor 2, and a grid-controlled discharge device 25. The capacitor 53 is charged during each negative half wave of the alternating voltage and discharges itself, after release by tube 25, through the auxiliary winding 33, thus issuing to that winding a current pulse whose amplitude is kept constant by the transductor 54. For this purpose the core of transductor 54, (representing a saturable reactor or saturable transformer) is magnetically excited by its control winding 56 up to far above its saturation knee. The control winding 56 is connected through a stabilizing reactor 57 and an adjusting or calibrating resistor 58 to a suitable source of direct voltage 69, here schematically represented by a battery, the polarity of connection being such that the magnetizing effect of control winding 56 is opposed to that of the discharge current flowing in the main winding 55 of transductor 54. Under these conditions, the discharge pulse has such a magnitude that it just balances the direct-current premagnetization. Therefore, by adjusting the direct-current premagnetization with the aid of resistor 58 the magnitude of the current pulse and hence the magnitude of the constant component of the make premagnetization can readily be adjusted to the proper value.

The voltage-responsive component of the make premagnetization is supplied by an auxiliary circuit 42, which, for instance, may excite a separate auxiliary winding 13 on the core of the commutating reactor. The circuit 42 includes an adjusting resistor 14 and may also be equipped with a half-wave rectifier 15, such as a barrier layer rectifier. The circuit 42 may further be connected to the discharge tube 25 at point *g* instead of being connected at point *f* as illustrated.

In the case of motor-actuated converter contacts, the grid of tube 25 may be controlled by the drive itself, particularly by the drive pertaining to the converter contact in the same phase circuit. To this end, the grid circuit of tube 25 may be connected to a preclosing contact or to the movable converter contact itself in such a manner that the auxiliary circuit 42 becomes closed a small fraction of a millisecond ahead of the closing moment of the converter contact 4 proper, or at the latest together with the converter contact. This will be more fully described below in conjunction with Fig. 14.

Instead of being connected to the grid-controlled tube 25, the auxiliary circuit 42 may also be connected to another discharge device or, as illustrated, to a transductor 10*b*. Within its unsaturated range, the magnetic characteristic of this transductor has an appreciable inclination toward the flux axis. The transductor 10*b* is pre-excited by a stabilized direct-current circuit 65 in such a manner that it operates in an unsaturated initial condition when its main winding is not traversed by current. A regulating resistor 66 permits varying the pre-excitation to adjust the initial condition of transductor 10*b* to any desired point between the two saturation knees of its magnetic characteristic. Series connected with the main winding of transductor 10*b* is the primary winding of a small saturable transformer 67 whose core is magnetically excited by direct current in the known manner and whose secondary winding provides the control voltage for the grid of tube 25 in coaction with a series connected source 68 of direct voltage. The control circuit of winding 44' may also be connected with the transductor 10*b*, this circuit including a valve 49, a resistor 41 and an auxiliary source 47 of constant bias voltage. The bias voltage is so dimensioned that, with contact 4 closed, a sufficient flow of control current is maintained through winding 44' to hold contact 4 in closed position.

Figure 3:
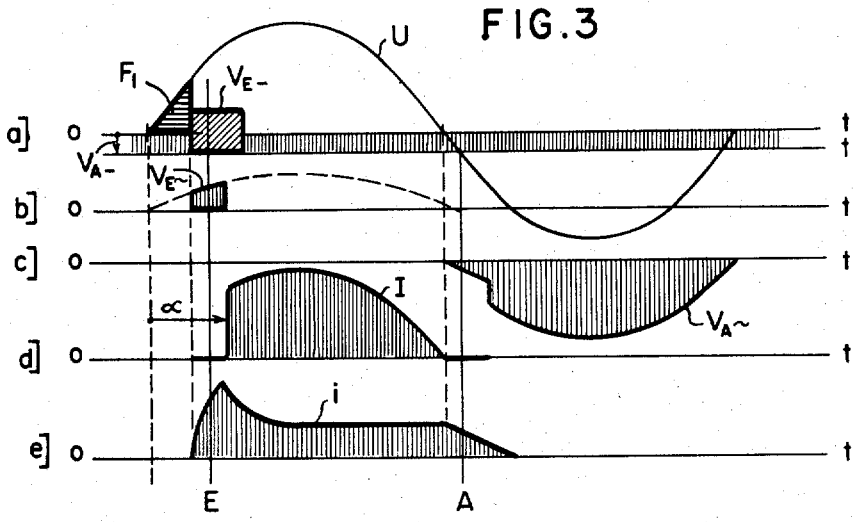
Fig. 3 shows five interrelated coordinate diagrams (*a*) to (*e*) explanatory of the operation of a converter according to Fig. 2.

For explaining the operation of the converter, reference will be made in the following to the diagrams shown in Fig. 3. In Fig. 3(*a*) the curve U represents the voltage of the power transformer (winding 1 in Fig. 2). The horizontal line $V_{A-}$ denotes the constant component of the break premagnetization (supplied by the constant ampere turns of auxiliary winding 6 in Fig. 2) effective during the entire operating period of the converter. The voltage U, ascending from zero, has at first the effect of placing the magnet core of the transductor 10*b* from its unsaturated initial condition into the saturated state. The necessary voltage-time integral is represented by the area $F_1$ and is indicative of the degree of voltage control (commutation delay angle) of the converter plant. The control degree therefore can be regulated by means of the resistor 66. After the transducer 10*b* is saturated, it releases a flow of current through its main winding. The increase of this current imparts through the switching transformer 67 an ignition pulse to the grid tube 25 so that the previously charged capacitor 53 discharges a constant current through the auxiliary winding 33 of the commutating reactor 2, thus supplying this reactor with the constant component $V_{E-}$ of make premagnetization. Simultaneously, the flow of current initiated through transductor 10*b* supplies the voltage-responsive component $V_{E\sim}$ of the make premagnetization according to Fig. 3(*b*) and passes through the auxiliary winding 13 of reactor 2. The released flow of transductor current also provides the control current *i* for the control winding 44' of the contact control magnet according to Fig. 3(*e*). The rise of control current *i* is delayed by the inductivity of the winding 44'. As soon as the current *i* exceeds the critical pick-up value of the magnet system, the contact 4 closes at the moment E. Shortly thereafter the make step ceases so that the load current I increases to its full value according to Fig. 3(*d*). This moment denotes the end of the delay interval or control angle $\alpha$. Thereafter, the control current *i* declines to a value which, at a corresponding adjustment of resistor 41, lies above the drop-off value of the control magnet. The load current I is shown in Fig. 3(*d*) for a load circuit of purely ohmic character. Through winding 44 this current exerts an additional holding force which vanishes when the load current wave reaches its zero value and enters into the break step. At first, however, the converter contact is still kept closed due to the control current *i* flowing in winding 44'.

The time curve of the voltage-responsive component $V_{A\sim}$ of the break premagnetization is shown in Fig. 3(*c*). This component, as mentioned above, is proportional to the commutating voltage, the proportionality factor being half as large during the break step as at a later stage. The voltage, which at the beginning of the break step occurs across the commutating reactor winding 3, is opposed to the driving alternating voltage and has practically the same magnitude as the latter. In the present case, therefore, the absolute values of the voltage across winding 3 increase from the zero value and act in opposition to the driving voltage from the battery or constant voltage source 47. This reduces the current *i* in the control circuit from the inception of the break step until the current *i* reaches zero. As soon as the declining current *i* subsides below the critical holding value of the control magnet, the converter contact opens at the moment A. Consequently, the contact can open only during a break step interval.

The fact that in the converter according to Fig. 2 the release of the premagnetizing circuit 52 is made dependent upon the initiation of the control current for the contact closing operation, results in the further advantage that the constant component of the make premagnetization and hence the occurrence of any make premagnetization, is completely prevented if due to any cause of trouble the control current for the contact closing operation should fail to appear.

Instead of providing the core of the commutating reactor 2 with an auxiliary winding 3*a* for supplying the voltage-dependent component of break premagnetization as described in the foregoing with reference to Fig. 2, a portion of the reactor main winding 3 may also be used for this purpose. It is then preferable to connect one half of the main winding into the auxiliary premagnetizing circuit because this reduces the losses in that circuit to a minimum.

Figure 4:
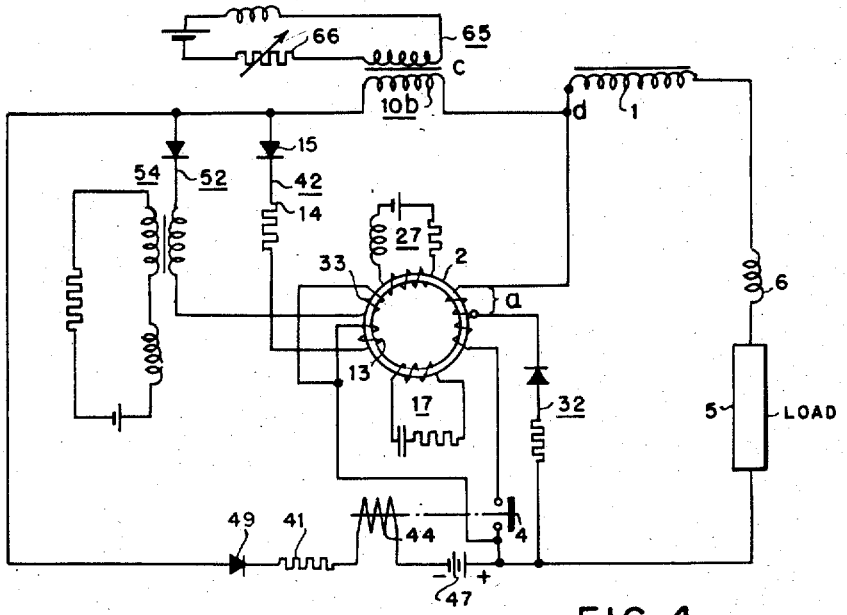
Fig. 4 is a modification of the single-phase contact converter shown in Fig. 2.

A converter basically similar to that of Fig. 2 but modified in the just-mentioned manner is shown in Fig. 4. This converter also differs from that of Fig. 2 in that the transductor 10*b* is not only connected to the control circuit for the make control coil 44' of the converter contact 4 and to the auxiliary circuit 42 for the voltage-responsive component $V_{E\sim}$ of the make premagnetization (auxiliary reactor winding 13), but is also connected to the auxiliary circuit 52 for supplying the constant components $V_{E-}$ of the make premagnetization (auxiliary reactor winding 33). In this case, the latter component, as well as the voltage-responsive component, may be directly supplied from the contact-closing voltage as soon as the transductor 10*b* reaches its saturated condition. Also in this case, the magnitude of the constant component is determined by the preexcitation of the transductor 54. It is also possible, alternatively, to pass both components of the make premagnetization current through the same auxiliary winding 13 of the commutating reactor thereby eliminating winding 33.

A converter according to Fig. 4 operates fundamentally in the same manner as the above-described converter according to Fig. 2. That is, the converter of Fig. 4 also affords a fully automatic adaptation of the make premagnetization to the particular moments of contact operation. The adjustment or regulation of the delivered voltage by delayed commutation is again effected with the aid of the resistor 66. In view of the fact that the auxiliary circuit for providing the constant component of the make premagnetization requires a relatively large expenditure in circuit elements, this component may be eliminated for lesser requirements, for instance, when an only small power rating or a small range of voltage regulation is demanded. In the latter case, the voltage-responsive component of the make premagnetization is to be increased accordingly.

Figure 5:
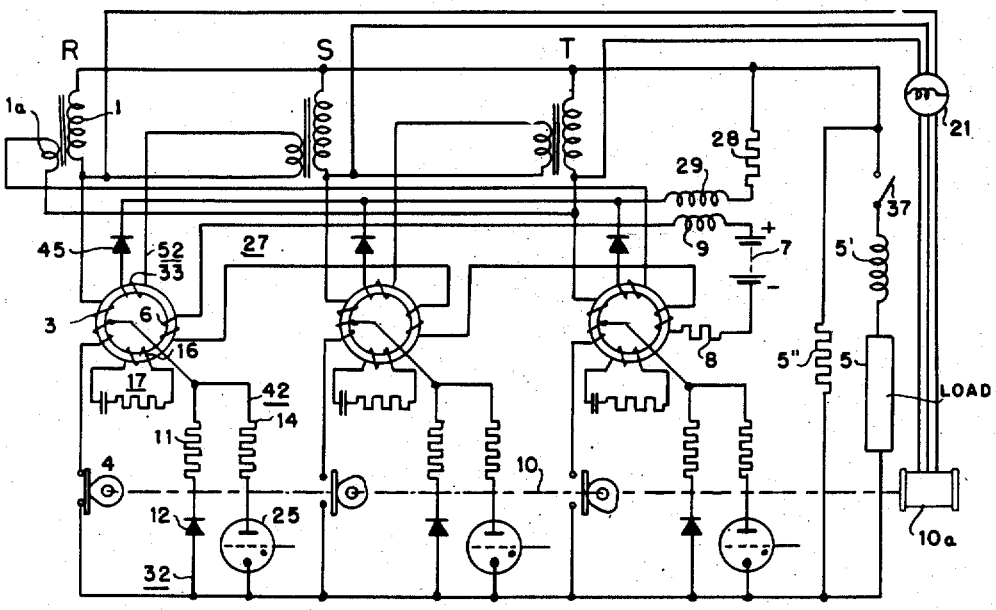
Fig. 5 shows a schematic circuit diagram of a modified three-phase converter.

Another possibility according to the invention for producing the constant component of the make premagnetization is available in three-phase converter circuits. Fig. 5 exemplifies this additional possibility.

The respective circuits pertaining to the three phases R, S, T of the converter shown in Fig. 5 have the same design and performance, except that the respective contact operations and the correlated effects in the three phases occur in a cyclical sequence and with the proper phase spacing. For that reason, the reference numerals mentioned below are applied in Fig. 5 only to the elements that either pertain to the phase R or are common to all three phases. It may be mentioned at this point that the embodiments shown as single-phase circuits (Figs. 2, 4, 7, 9, 16 to 18) are, of course, also applicable to multiphase converters in an analogous manner.

In the three-phase Y-connected converter of Fig. 5 the direct-current circuit comprises a load 5 in series with a smoothing reactor 5'. If, as shown, the load circuit is to be controllable by a circuit breaker 37, a shunt-connected base load 5'' may also be provided in the customary manner. The auxiliary circuit 52 which energizes the auxiliary winding 33 of the commutating reactor 2 is connected to the secondary winding 1 of the power transformer through a half-wave rectifier 45, a stabilizing reactor 29 and an adjusting resistor 28. An auxiliary secondary winding 1*a* of the power transformer is series connected in the circuit 52 for each phase so that the auxiliary voltage of each winding 1*a*, due to zig-zag interconnection of the windings 1*a* with the main windings R, S and T, is somewhat leading with respect to the voltage of its respective main winding 1. The auxiliary winding 33 of reactor 2 in circuit 52 has the polarity of connection required for its ampere turns (electromotive force) to act in opposition to that of the auxiliary winding 6 for producing the constant component $V_{E-}$ of the make premagnetization. The magnitude of the premagnetizing current in winding 33 is so adjusted that during the interval available for the make performance the instantaneous current values are approximately twice as high as the premagnetizing current in winding 6, assuming both windings to have the same number of turns. The voltage-responsive component of the make premagnetization is supplied by the auxiliary circuit 42 with the grid-controlled discharge tube 25. The control circuit for the grid of tube 25 (not illustrated in Fig. 5), could for example be the same as that illustrated in Fig. 14(*a*) and described below in connection with the operation of the circuit shown in Fig. 14. The grid circuit is operative to control tube 25 to initiate the voltage responsive component $V_{E\sim}$ of the make magnetization shortly before the closing moment of the main contact.

Figure 6:
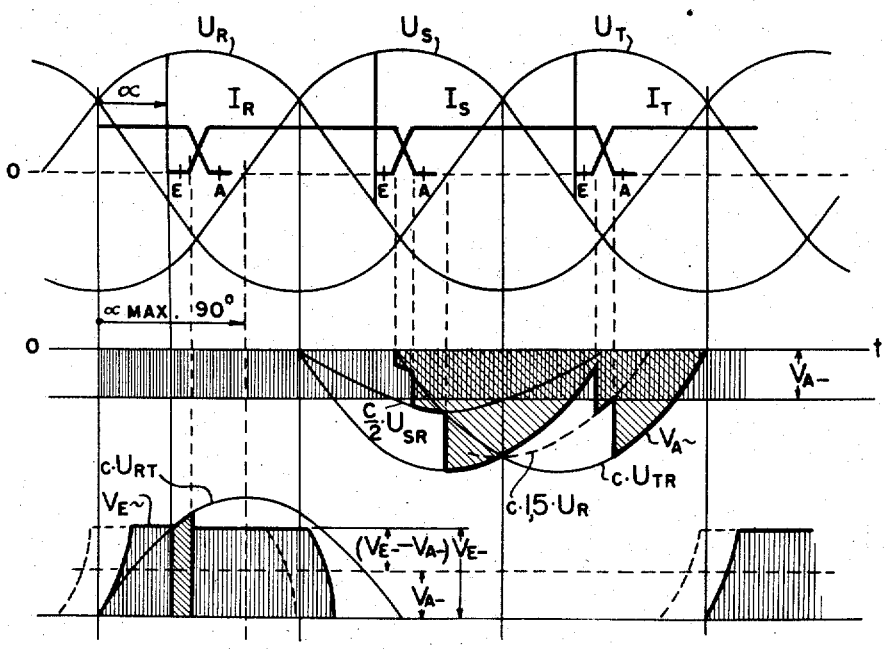
Fig. 6 presents a set of coordinate diagrams for explaining the operation of a converter according to Fig. 5.

The operation of the converter according to Fig. 5 may be more fully explained, with reference to the diagrams of Fig. 6, under the assumption that the rectified output current of the converter is completely smoothed by the reactor 5'. The upper portion of Fig. 6 shows the time curve $U_R$, $U_S$, $U_T$ of the main voltages of the power-transformer secondaries 1 in the respective converter phases R, S, T. The upper portion of Fig. 6 further shows the corresponding phase currents (main currents $I_R$, $I_S$, $I_T$ flowing through the respective converter contacts at a control angle of approximately $\alpha=40°$, the limit being at about $\alpha_{max}=90°$ for this example. The current steps practically coincide with the zero axis. The make moments E and the break moments A of the converter contacts lie within the current steps.

The next lower portion of Fig. 6 represents the break premagnetization. The constant component $V_{A-}$ (auxiliary circuit 27) is indicated by a horizontal line below the zero axis and is emphasized by vertical cross-hatching This component is continuously present as long as the converter is in operation. The voltage-responsive component $V_{A\sim}$ (auxiliary circuit 32) is illustrated for the commutating reactor 2 of the converter phase R. As long as the full current $I_R$ is being transferred, the commutating reactor of this phase is saturated and virtually no voltage occurs across its main reactor winding. As soon as, after the contact closing in phase S, the pertaining commutating reactor is saturated, a steep change in current takes place due to the commutation voltage $U_{SR}$. This causes a small voltage to be induced in the commutating reactor of phase R due to the air inductivity of this reactor. The induced small voltage drives a current through the auxiliary circuit 32 in the flow direction of valve 12. Due to the desaturation of the commutating reactor at the zero passage of current $I_R$ at the beginning of the break step, one-half of the commutation voltage $U_{SR}$ becomes effective in the auxiliary circuit 32 if this circuit, as shown, is connected to the midpoint of the commutating reactor winding 3. This is so because at this moment the full commutation voltage is effective across the entire winding 3. Now the break step interval takes its course. At the moment A of the break step the converter contact 4 of phase R opens. However, a magnetizing current continues to flow through the auxiliary current path 32. This continued current prolongs the premagnetization of the commutating reactor in phase R in coaction with the constant component $V_{A-}$ of the break premagnetization and without change in the magnetomotive-force direction until the commutating reactor is saturated and hence the break step terminated. From this moment on, the commutation voltage $U_{SR}$ is shifted from across the reactor winding 3 to across the opened contact device 4 thus making the full voltage effective in the auxiliary circuit 32. Due to the predominantly ohmic impedance of auxiliary circuit 32, the premagnetization $V_{A\sim}$ is at any moment proportional to the driving voltage that produces this premagnetization (factor $c$). Consequently, during the break step $V_{A\sim}=c\cdot U_{SR}/2$, and immediately after the break step $V_{R\sim}=c\cdot U_{SR}$. The further course is immediately apparent from the drawing. During the current transfer (commutation) between the phases S and T, that is during the interval of time in which the contacts of these two phases are both closed and the respective commutating reactors are both saturated, the auxiliary circuit 32 is subjected to 1.5 times the amount of the voltage of phase R; and after the phase S enters into the break step, the interphase voltage $U_{TR}$ becomes effective in the auxiliary circuit 32 pertaining to the phase R. Essential for this time course of the break premagnetization $V_{A\sim}$ is the fact that it acts in the same direction as the constant component $V_{A-}$, i. e. in opposition to the magnetomotive-force caused by the main current flowing through the converter contacts. Consequently, although the starting moment of the break step may occur at any desired moment, the converter affords the security that this step practically coincides with the current zero line except during the interval of time within which the contact is to close.

On the other hand, the make premagnetization is effective only during such an interval of time in which generally the conditions are suitable for the closing of the converter contact, the voltage then having the direction needed for driving the current in the desired direction through the contact. With a normal voltage characteristic, these conditions are satisfied for the contact in phase R from the moment when the ascending phase voltage $U_R$ becomes larger than the descending phase voltage $U_T$. At this moment, first the constant component $V_{E-}$ of the make magnetization becomes effective in the auxiliary circuit 52, if at first the leading angle of the here effective driving voltage is disregarded. The bottom portion of Fig. 6 represents this make premagnetization of the commutating reactor in phase R. The magnitude $V_{E-}$ of this make premagnetization has about twice the value of the constant component $V_{A-}$ of the break magnetization so that a total constant premagnetizing component ($V_{E-}-V_{A-}$) will result which is about equal to the constant component $V_{A-}$ of the break premagnetization but has the opposite polarity. The designations entered into the bottom diagram of Fig. 6 refer to absolute values. The curve shape of the constant component $V_{E-}$ of the make premagnetization, in the present case, results from the fact that the auxiliary circuits 52 of the three phases are combined with the pertaining valves 45 to a three-phase rectifier arrangement in Y-connection. The duration of the constant component of the make premagnetization within the alternating voltage cycle in this example is limited to the interval of time within which the closing moment may be shifted for voltage control by delayed commutation. The curve shown by a heavy full line whose area is vertically cross-hatched in the bottom diagram of Fig. 6, has a leading phase relation to the corresponding curve shown by a broken line, this being due to the above-mentioned phase combination involving the additional transformer windings 1*a*.

The voltage-responsive component $V_{E\sim}$ of the make premagnetization would immediately commence at the end of the voltage-responsive break premagnetization $V_{A\sim}$ (apparent from the middle diagram of Fig. 6) and would also immediately follow the voltage $U_{TR}$ (or now $U_{RT}$) if the valve 12 were not provided. This valve, however, makes certain that after the occurrence of a voltage acting in the contact-closing sense, there will at first be a complete cessation of voltage-responsive premagnetization. This premagnetization is released only by the subsequent ignition of the tube 25 at, or shortly prior to, the closing moment of the converter contact 4 and is then effective in the contact closing sense, namely in the same direction as the main current. This causes the voltage $U_{RT}$ to appear across the commutating reactor winding 3 so that the contact closing takes place free of voltage and the flow of main current is at first prevented until the commutating reactor saturates in the contact-closing sense. Only then can the current commutation commence with a steep rise of the current $I_R$. Consequently, the above-mentioned electrical or other coupling, such as the mechanical coupling of the control for tube 25 with the device that closes the converter contact, has the result that the converter system prepares itself for the closing operation only when the conditions are such that the operation may actually be carried out without danger to the contacts.

However, the last-described modification does not afford such a fargoing reduction in the duration of the make premagnetization as is possible if the constant component of this premagnetization is put into action with a phase position automatically adapting itself to the contact-closing moment as is the case in the embodiments previously described with reference to Figs. 2 and 4.

In all above-described embodiments of the invention the constant component of the break premagnetization is brought about by a direct current on which an opposing premagnetization for the make performance is superimposed within a limited interval of each cycle period. Instead, and as introductorily mentioned, a premagnetization of alternating direction, preferably of trapezoidal wave shape, may also be applied, for instance, with the aid of an auxiliary rectifier circuit or a series transductor comprising two opposingly pre-excited saturable reactors. Exacting requirements as regards reliability and safety of operation can be satisfied by properly selecting not only the direction but also the magnitude of such a pre-excitation, preferably independently for the make performance on the one hand and the break performance on the other hand. This prevents any adjustment of the pre-excitation for the make performance from being accompanied by an undesired or possibly even dangerous misadjustment for the break performance, and vice versa.

The desired independence can be obtained, when using a series transductor, by mutually adapting a direct-current pre-excitation of the transductor and the opposingly acting transductor pulse. Accordingly, the communtating reactors in the embodiments described below are equipped with a premagnetizing circuit which contains the main winding of a series transductor (hereinafter briefly called "transductor circuit"), as well as with a direct-current premagnetizing circuit which includes the direct-current coils of the same transductor, the latter circuit being so rated or tuned that it balances the opposingly acting premagnetizing pulse from the transductor circuit.

Figure 7:
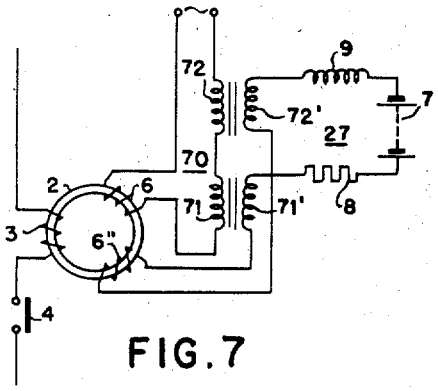
Fig. 7 is a partial single-phase circuit of another converter.
Figure 9:
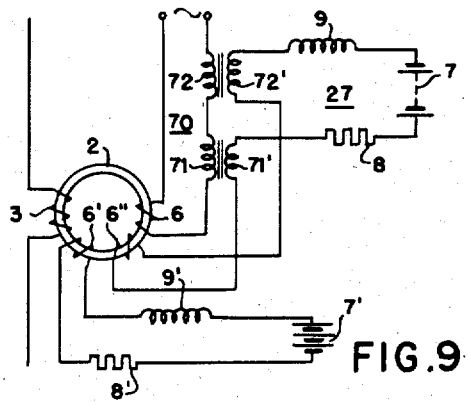
Fig. 9 shows another partial converter phase circuit.
Figure 8:
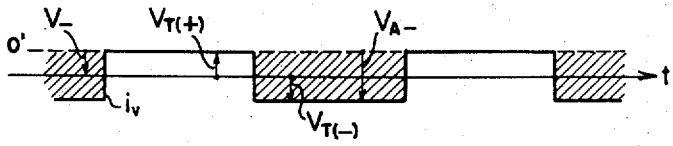
Fig. 8 is a pertaining explanatory voltage diagram.
Figure 10:
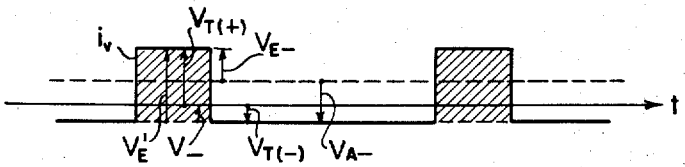
Fig. 10 is an explanatory voltage diagram relating to Fig. 9.

Modifications of converters according to the invention embodying the just-mentioned features are illustrated in Figs. 7 and 9 in conjunction with the respective explanatory diagrams of Figs. 8 and 10. Figs. 7 and 9 show only a portion of a circuit pertaining to one phase of the converter circuit. Complete converter circuits involving such circuit portions are described in a later place.

Fig. 7 shows a commutating reactor 2 with a saturable magnet core whose main winding 3 is series connected with the converter contact 4. A transductor 70 is provided for premagnetizing the commutating reactor. The transducer 70 in this example is composed of two similar saturable reactors whose main windings 71 and 72 are series connected with the premagnetizing windings 6 of the commutating reactor. The transductor circuit is connected to a source of alternating voltage of suitable magnitude and phase position. This voltage may be taken from the energizing voltage of the converter, for instance, with the aid of an auxiliary transformer in a multiphase connection and preferably with a phase combination or zig-zag connection similar to the corresponding circuit devices described with reference to Fig. 5. The direct-current excitation windings 71' and 72' of the transductor are connected in series opposition. Series connected with windings 71' and 72' are another premagnetizing winding 6'' of the commutating reactor, a stabilizing reactor 9 and an adjusting resistor 8. This direct-current circuit is energized from a suitable voltage source 7 exemplified by a battery. The illustrated premagnetizing device may serve for producing a constant component of the break premagnetization. The arrowhead entered upon the main circuit is supposed to indicate the direction of the current to pass through the converter contact 4 when the latter is closed.

During the operation of the device, a premagnetizing current $i_v$ flows through the transductor circuit, the time curve of this current being represented by the idealized rectangular wave shown in Fig. 8. The current $i_v$, passing through winding 6, produces alternately positive and negative premagnetizing pulses $V_{T(+)}$ and $V_{T(-)}$ of the same absolute magnitude, and both having the same duration equal to a half-wave period of the alternating voltage. Superimposed on these pulses by means of the windings 6'' is a direct-current premagnetization $V_-$ which balances the positive pulses $V_{T(+)}$. This requires that the ratio of the winding turns $w_6/w_{6''}$ of windings 6 and 6' be in accordance with the transformer ratio $w/w'$ of the working windings (main windings) to the direct-current windings of the transductor. The resulting premagnetization $V_{A-}$ is a unipolar, namely negative pulse of the duration of a half wave. This pulse is apparent from Fig. 8 if the line denoted by 0 is taken as the zero line. By changing the resistance adjustment of resistor 8 the pulse magnitudes $V_{T(+)}$ and $V_{T(-)}$, as well as the amount $V_-$, are changed to the same extent. Consequently, the ultimate result of such a change in adjustment is always a unipolar, negative pulse except that its absolute value is different. In the period of time between two pulses, any other magnetizing components that may possibly be present are not affected by a change in resistance adjustment of resistor 8.

Another premagnetizing device is shown in Fig. 9. This device may serve for providing a constant component of the make premagnetization in form of a unipolar positive pulse of a duration shorter than a half wave. This modification involves subject matter also disclosed in the copending application of M. Belamin, Serial No. 311,395, filed September 25, 1952. The negatively pre-excited saturable reactor 72/72' of the transductor 70 in this modification has a smaller transformation ratio $w_2/w_2'$ and hence is more strongly excited than the positively excited saturable reactor 71/71' whose transformation ratio $w_1/w_1'$ is made larger, for instance, by using a smaller number of winding turns in the pertaining direct-current winding 71'. In this case the winding 6'' and its premagnetizing circuit may at first be disregarded.

Fig. 10 shows the time curve of the premagnetizing current $i_v$ in the tranductor circuit. This current supplies positive pulses of the magnitude $V_{T(+)}$ and negative pulses of a smaller magnitude $V_{T(-)}$. Added to these pulses is the direct-current premagnetization $V_-$ in the positive direction and of the same magnitude as $V_{T(-)}$. Hence the negative pulses $V_{T(-)}$ are balanced so that unipolar, positive pulses $V'_E$, counted from the line 0, will remain. This requires that the winding turn ratio $w_6/w_6''$ be equal to the winding turn ratio $w_1/w_1'$ of the windings 71 and 71' that determine the negative pulse. Such a make premagnetization with unipolar positive pulses may be used, for instance, together with a break premagnetization according to Figs. 7 and 8, provided the phase relation is properly adapted so that the phase position for each device may be varied independently of the other. In cases where such a mutual independence is not required, the direct-current circuits of the two premagnetizing devices may be combined in a common direct-current circuit which includes all direct-current windings in series connection. Similarly, in multiphase converters, all direct-current circuits in premagnetizing devices of the same kind pertaining to the different phases may be combined with one another without disturbing the independence from circuits for other kinds of premagnetizing components.

A simplification, in comparison with the above-described mutually independent premagnetizing circuits may often be found permissible from the following considerations. It is impuortant that a change in adjustment of $V_{E-}$ does not affect the magnitude of $V_{A-}$ because even a temporary increase in magnitude of $V_{A-}$ may lead to arcback at the converter contact. A temporary variation of $V_{E-}$, however, does not endanger the reliability of operation but may at most have a slight effect upon the occurrence of transfer of contact material. Accordingly, the device shown in Fig. 9 is supplemented by the winding 6' with a pertaining separate direct-current circuit comprising a direct-current source 7' such as a battery, a stabilizing reactor 9' and an adjusting resistor 8'. According to Fig. 10 this circuit provides a continuously effective negative direct-current premagnetization in the amount of the required break premagnetization $V_{A-}$. Superimposed on this continuous magnetization are unipolar pulses as described. The magnitude $V'_E$ of the pulses is so adjusted that after deduction of the amount $V_{A-}$ the required premagnetization $V_{E-}$ will exist. Generally the value $V_{E-}$ may be somewhat lower than for the break performance as is apparent from Fig. 10. When in the device according to Fig. 9 the magnitude of the make premagnetization $V_{E-}$ is changed by means of resistor 8, the change does not affect the break premagnetization. When changing the break premagnetization $V_{A-}$ by adjusting the resistor 8', the value of $V_{E-}$ will also vary, namely as may be deduced from Fig. 10, by the same amount and in the opposite sense. However, this does not appreciably impair the operation and may safely be corrected by a subsequent readjustment of $V_{E-}$.

Another component circuit device, incorporated in the more comprehensive embodiments still to be described, or applicable as a modification in converters otherwise similar to those described above, relates to the means for supplying the commutating reactor with the variable voltage-responsive component of premagnetization. The circuit means so far described for producing the voltage-responsive premagnetization may be used in any single-phase and multiphase rectifier connections in which each converter contact has its own commutating reactor (half-wave rectifiers). However, there are also rectifier systems in which one and the same commutating reactor serves to produce the break step of two converter contacts operating in push-pull, namely during positive and negative half waves respectively of the alternating current to be rectified (full-wave rectifiers). This is the case, for instance, in three-phase bridge connections with six converter contacts and only three commutating reactors, this so called "three-reactor scheme" being at present predominant in contact converters with motor-driven contacts. The basic scheme is represented in Fig. 11.

Figure 11:
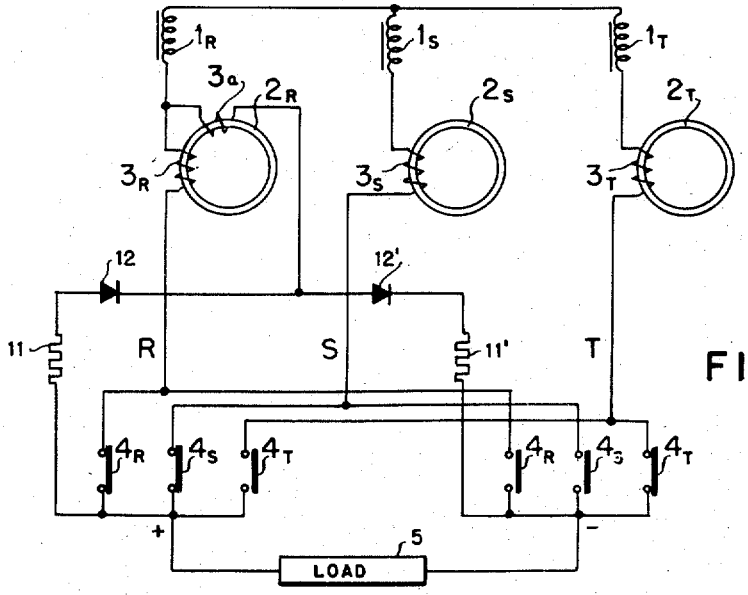
Fig. 11 shows essentially a known basic bridge circuit of a three-phase full-wave converter and is presented for explanatory purposes in conjunction with Fig. 12 showing a converter of the same type in a circuit design according to the invention.

In Fig. 11 the secondary windings $1_R$, $1_S$, $1_T$ of the power supply transformer are connected through the respective reactor windings $3_R$, $3_S$, $3_T$ on respective saturable cores $2_R$, $2_S$, $2_T$ with pairs of converter contacts $4_R$ and $4'_R$, $4_S$ and $4'_S$, $4_T$ and $4'_T$. The contacts are interconnected by a bridge circuit and the two contacts of each pair operate in push-pull. A load 5 is connected in the output branch of the bridge circuit to be energized by full-wave rectified current.

The above-described circuit connection for producing the voltage-responsive premagnetization component cannot readily be applied in such a bridge type rectifier circuit. If one attempted to connect the voltage-responsive premagnetizing circuit at one end to the transformer side of a reactor main winding and at the other end to the load side of the pertaining converter contact, as is entered in Fig. 11 by a dotted line, then the two premagnetizing circuit branches 11/12 and 11'/12' leading to the positive and to the negative output buses respectively of the converter would operate as a voltage divider with respect to the rectified output voltage, and the premagnetizing winding 3*a* of the commutating reactor would then be connected to the voltage midpoint of this voltage divider. The resulting voltage and current conditions would fundamentally depart from those desired and necessary for the proper operation of the rectifier. In fact, due to the preloading of the valves 12 and 12' by the direct current flowing from the positive to the negative bus through the two branch circuits 11, 12 and 11', 12', the valves 12 and 12' would not be capable of directing the premagnetizing current in the one-half wave to contact $4_R$ and in the other half wave to contact $4'_R$.

According to another feature of my invention, however, the connection for the voltage-responsive premagnetizing circuit may be so modified that it satisfies the requirement of properly premagnetizing the commutating reactor prior to the contact opening moment without incurring the detrimental voltage-dividing effect explained in connection with Fig. 11.

To achieve this improvement, I connect in a multiphase contact rectifier the voltage-responsive premagnetizing circuit of one phase to the phase next following in the commutation sequence. In other words, the voltage-responsive premagnetizing circuit forms a "cross-phase" circuit instead of the "along-phase" circuit of the embodiment so far described. In connection therewith, and as already mentioned, a portion of the main reactor winding may be used as a premagnetizing winding. In a bridge connection with only one commutating reactor for two converter contacts operating in push-pull, the provision of the cross-phase connection of the voltage responsive premagnetizing circuit obviates the valve 12 required in the corresponding along-phase connection described for the preceding embodiments. However, the valve 12 must be retained in converters with one contact per commutating reactor even if the voltage-responsive premagnetizing circuit is cross-phase connected.

Figure 12:
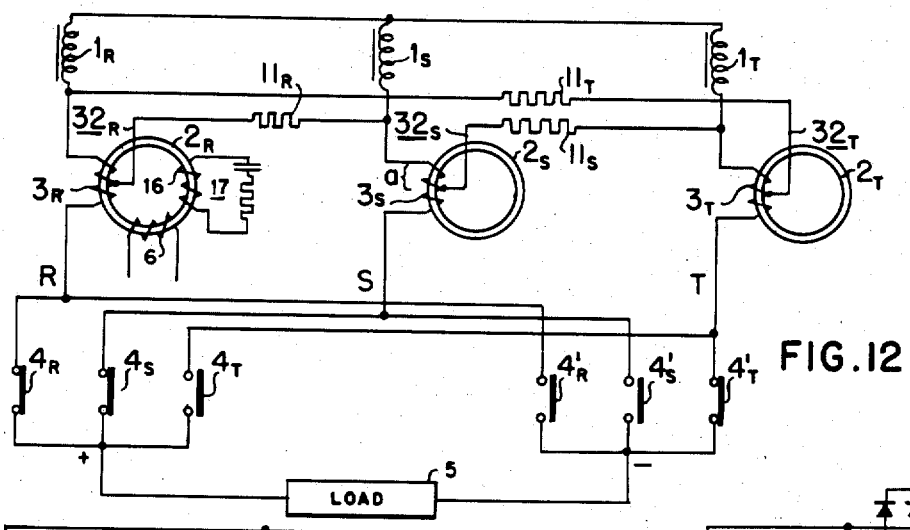

A three-reactor connection with cross-phase connected circuits for the voltage-responsive component of the break premagnetization is shown in Fig. 12. The illustrated positions of the converter contacts $4_R$ to $4'_T$ correspond to the condition existing shortly prior to he opening of conact $4_R$. Consequently, contact $4_S$ has already closed and carries direct current from phase S to the positive pole of the load 5, while the likewise closed contact $4'_T$ passes the direct current from the negative pole of load 5 back to phase T of the power transformer. At this stage the core $2_S$ of the commutating reactor in phase S has been saturated from the inception moment of the load current in phase S so that no voltage is effective across the reactor winding $3_S$. Consequently, the contact $4_R$, the contact $4_S$, the positive pole of load 5, and the winding $3_S$ of the reactor in phase S are all on the same potential, namely on the potential of the terminal of transformer winding $I_S$. It is therefore irrevelant, for the time characteristic of the premagnetization during the break step interval of a decaying phase, at which particular circuit point between the transformer terminal of the incipient phase and the alternating-current side of the contacts in the decaying phase, the premagnetizing circuit branch is connected. According to Fig. 12, for instance, this point of connection lies at the transformer side of the commutating reactor winding $3_S$ pertaining to the incipient phase. Since at the instant under consideration the contacts $4'_R$ and $4_S$ are open, no connection between the premagnetizing circuit and the negative direct-current pole exists during the break step for the commutating reactor in the decaying phase R. Hence, the undesired voltage-divider effect cannot occur. In the other half wave, when the contacts $4_T$, $4'_R$ and $4'_S$ are closed and the contact $4'_R$ will shortly be opened, the premagnetizing circuit is connected in the desired manner with the negative direct-current pole through the contact $4'_S$, and there is no connection with the positive pole. With this type of connection for the premagnetizing circuit therefore the switching of the voltage-responsive premagnetizing current in the one half wave to the positive direct-current pole and in the other half wave to the negative pole is automatically effected by means of the corresponding contacts of the incipient phase. This is also the reason why, as mentioned, particular valves are not required for this control purpose. The entire voltage-responsive premagnetizing circuit therefore consists only of the premagnetizing winding 3*a*, (or, instead, a portion "*a*" of the reactor main winding) and the low inductance ohmic resistor $11_R$.

The constant component of the premagnetizing flux is produced with the aid of the auxiliary winding 6. Because of the double utilization of the commutating reactor for producing break steps in both half waves, this constant component of premagnetization cannot be preduced by direct current but requires an excitation of alternating polarity and preferably of trapezoidal wave shape as described previously.

When using a single break-step reactor for two, push-pull contacts according to Fig. 12, this reactor cannot also be used for producing the make steps. It is then necessary to provide either a separate make reactor or at least a separate make core which has the reactor main winding in common with the pertaining break core. In both cases the commutation reactors have separate make cores. The difference in the functioning of the make cores from that of the break cores is determined by their different premagnetization. The premagnetization of the separate make cores is preferably also composed of a constant component and a voltage-responsively variable component, the phase position and magnitude of these components being, of course, different from those of the break cores.

Figure 13:
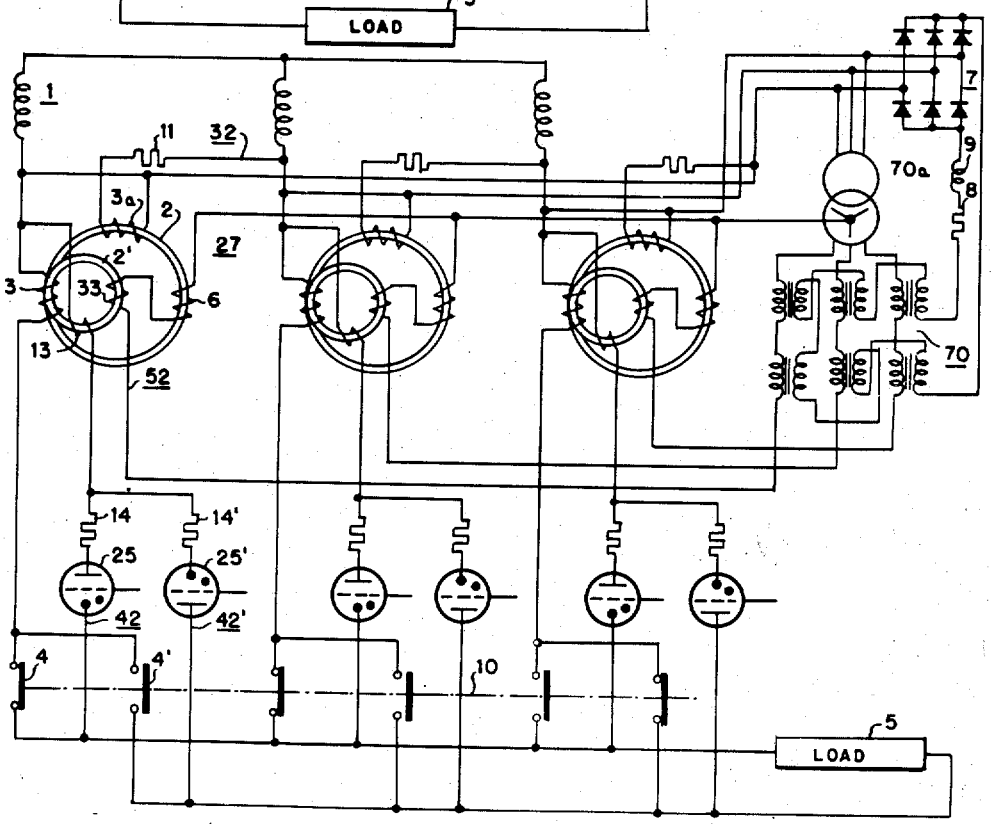
Figs. 13 and 14 are respective circuit diagrams of two more elaborately designed three-phase converters.

The embodiment illustrated in Fig. 13 exemplifies the just-mentioned features in a three-phase full-wave (bridge connected) rectifier. The rectifier is connected to a source of alternating voltage here again consisting of the secondary windings 1 of a three-phase power supply transformer. The anode lead in each phase is connected to the main winding 3 of a commutating reactor which has a make core 2' and a break core 2 both inductively linked with the main winding 3. The two cores operate during the respective make and break steps to reduce the instantaneous current practically to zero. From the reactor main winding 3 of each phase the anode lead branches to two converter contacts 4 and 4′ of which the former is connected to the positive bus and the latter to the negative bus of the direct-current load circuits. The two contacts are either motor driven or are electromagnetically controlled in dependence upon the instantaneous values of the current or voltage. The actuating means are schematically indicated by a dot and dash line 10. The direct-current circuit includes a load 5 and may also be equipped with a stabilizing series reactor and such auxiliary devices as shown, for instance, in the load circuit illustrated in Fig. 5.

The make core 2′ receives a constant premagnetizing component through an auxiliary winding 33, and also a voltage-dependent component through an auxiliary winding 13, both auxiliary windings being disposed on core 2′ but not inductively linked with the core 2. During make performance, both components have the same magnetizing direction as the main current winding 3. The break core 2 receives corresponding premagnetizing components through the auxiliary windings 6 and 3*a* which are inductively linked only with the latter core. Both components act during the break interval in a magnetizing direction opposed to that of the main current. The constant premagnetizing component is furnished by an auxiliary current of alternating direction and trapezoidal wave shape which, in this embodiment, is supplied from a three-phase symmetrical series transductor 70. The phase position of the trapezoidal current may be adjusted by means of a suitable phase combination, for instance, and as shown, by a transformer 70*a* energized from the secondary windings 1 of the power transformer. The auxiliary transformer 70*a* may be substituted by a rotary phase-shift transformer to permit a supplemental adjustment in phase position. One and the same trapezoidal current may be used for the two reactor cores 2′ and 2. Accordingly, the auxiliary reactor winding 6 and 33 are shown to be series connected. Under the condition that the make and break cores have the same average diameter and consist of the same magnetizable material and have the same magnetizing behavior, the turn number of winding 33 on the make core 2′ is preferably somewhat smaller than the turn number of winding 6 on core 2.

The excitation windings of transductor 70 are all series connected and are energized from a source 7 of direct-current, exemplified by a rectifier arrangement, through an adjusting resistor 8 and a stabilizing reactor 9.

The auxiliary circuit of winding 13 supplying the make core with the voltage-responsive premagnetizing component, is branched into two circuit portions with respective resistors 14, 14′ and respective valves 25 and 25′ of mutually inverse connection polarities. This auxiliary circuit, as a whole, lies parallel to the series connection of the reactor main winding 3 and the respective converter contacts 4, 4′. The valves are controlled with the aid of such grid circuit means as repeatedly mentioned in the foregoing or as described hereinafter in conjunction with Figs. 14 and 14*a*, so that the auxiliary currents in the winding 13 occur each time either simultaneously with the contact closing moment or shortly prior to that moment, depending upon whether the entire make step or only a rest portion thereof is supposed to occur after the make moment. This is determined by the voltage control angle (commutation-delay angle) of the rectifier plant and the corresponding magnitude of the commutation voltage which obtains during the make performance and reverses the magnetization of the reactor core 2′ during the make step interval.

The voltage-dependent component of the break premagnetization is applied to the auxiliary winding 3*a* through a resistor 11 by the voltage between the decaying and incipient phases of the alternating current source 1 that participate in any particular commutation. These parts form a cross-phase circuit in zig-zag connection as explained in the foregoing. The operation of the rectifier according to Fig. 13 is also in accordance with the foregoing explanations and hence requires no further discussion.

The following explanations relate to further improvements, mainly of such contact converters in which only one contact is correlated to each commutating reactor.

During the break operation, the premagnetization remains effective after the interruption of the phase current and continues the remagnetization beyond the break step an additional interval of time without changing its direction (which, for distinction, may be taken as negative) until the reactor core reaches saturation. When the premagnetizing current ceases, the magnetizing condition of the commutating reactor returns to the negative point of remanence. Without special expedients therefore, the entire step would have to be traversed in the opposite direction after the next reclosing of the contact, before the load current could rise. In general, this is undesired because of the resulting reduction in voltage and power factor. To avoid this deficiency, it is necessary to have the resaturation of the commutating reactor in the make direction (positive direction) at least partially occur at a moment sufficiently ahead of the next contact closing moment.

If, further, separate cores or even separate complete commutating reactors are provided for producing the respective make and break steps in combination with the aforedescribed premagnetizing, controlling and other auxiliary circuits, then care must be taken, for instance with the aid of additional premagnetizing circuits, that at the closing of the contacts the pertaining break core of the commutating reactor is saturated, and at the opening of the contacts the pertaining make core is saturated, so that neither core can interfere with the proper functioning of the other.

To this end the premagnetizing devices may be modified, for instance, in such a manner that the resulting magnetomotive force of the reactor core for producing the break step has, during a limited interval of time within each period, a magnetizing direction suitable for back-magnetization in the make sense and that then the magnitude of this resulting magnetomotive force has a value above the static remagnetizing value and drops at least as far as to this static value and preferably even down to zero before the occurrence of the contact closing moment. If such a device is equipped with a separate make core, the premagnetization of the make core may also be modified in a similar manner.

Figure 1:
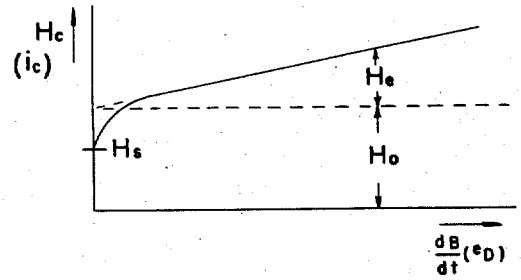

The static remagnetization value $H_s$ according to Fig. 1 has one definite value for a reactor core of high-quality magnetic material whose characteristic in the unsaturated range runs parallel to the flux axis. For a magnet core of lower-quality material a correspondingly definite value of the magnetomotive force may also be fixed, for instance, by means of a stretching or shaping circuit as described in the foregoing (27 in Figs. 2, 4). However, even without shaping circuits, the above-described requirement can reliably be met also with commutating-reactor cores of lesser magnetic quality if the resulting magnetomotive force during the mentioned limited time interval is larger than the highest magnetomotive-force value of static remagnetization as indicated by the ordinate value of the saturation knee in the ascending branch of the magnetization characteristic, and if further the resulting magnetomotive-force declines to the lowest static remagnetization value, that is practically to zero, before the occurrence of the contact closing moment.

The back-magnetization of the commutating reactor has the effect of supplying it prior to the make operation with a voltage integral of a given magnitude which appears as an area in the voltage time diagram, this voltage integral having the function of remagnetizing the commutating reactor wholly or partially in the direction of the positive saturation at a time ahead of the closing moment.

The required amount of the back-magnetization may differ depending upon the particular circuit scheme of the converter. If in the above-mentioned group of converter connections with only one contact per commutating reactor a separate make core is provided, then the main core (break core), as a rule, is always completely remagnetized up to positive saturation. Similar conditions apply analogously to the make core. On the other hand, if one and the same core serves for producing the make step as well as the break step, and if a voltage regulation by mechanical control (delayed commutation by phase-shifting the contact closing moment) and especially with a large angle of commutation delay is desired, then much of the back-magnetization should be anticipated prior to the closing moment so that only a relatively short residual portion of the make step can occur after the closing moment. As a result, the step interval which otherwise would have an undesirably long duration because of the low values of commutating voltage obtaining in this case, becomes effective only during an interval of the desired short duration. In both above-mentioned cases of mechanical voltage control the supply of a voltage area (voltage-time integral) of invariable magnitude is generally involved. In contrast thereto, the magnetic voltage control (involving a magnetic control of the commutating reactors) which operates with a make step of variable length, requires that the magnitude of the back-magnetizing voltage area (voltage-time integral) be regulatable to a large extent.

It is advantageous to give the back-magnetization the character of a pulse of limited duration because, for instance with respect to the break core, this magnetization must commence only after the cessation of the break step and should terminate before the closing moment, so that this pulse at that moment can no longer impose a voltage on the commutating reactor thus permitting the contact to close free of voltage. For that reason, only a portion of the cycle period of not much more than 60° electrical is generally available for applying the back-magnetizing pulse.

In principle, any kind of pulse is suitable as a back-magnetizing pulse provided it is capable of supplying the commutating reactor within the available cycle portion with a voltage area of the required magnitude, the particular wave shape of the pulse being not essential. During the back-magnetization, the current in the pulse circuit corresponds to the step current of the commutating reactor plus an amount required for compensating any additionally present opposingly directed premagnetization.

One possibility according to the invention of producing such back-magnetizing pulses consists again in the application of anode currents from rectifier arrangements. Because of the limitation of the back-magnetizing interval, a six-phase Y-connection of the auxiliary rectifiers is preferably applicable for this purpose.

Another way of producing back-magnetizing pulses is offered by the application of the auxiliary devices according to Figs. 7 and 9, permitting the production of pulses of a duration shorter than 60° electrical.

Figure 14:
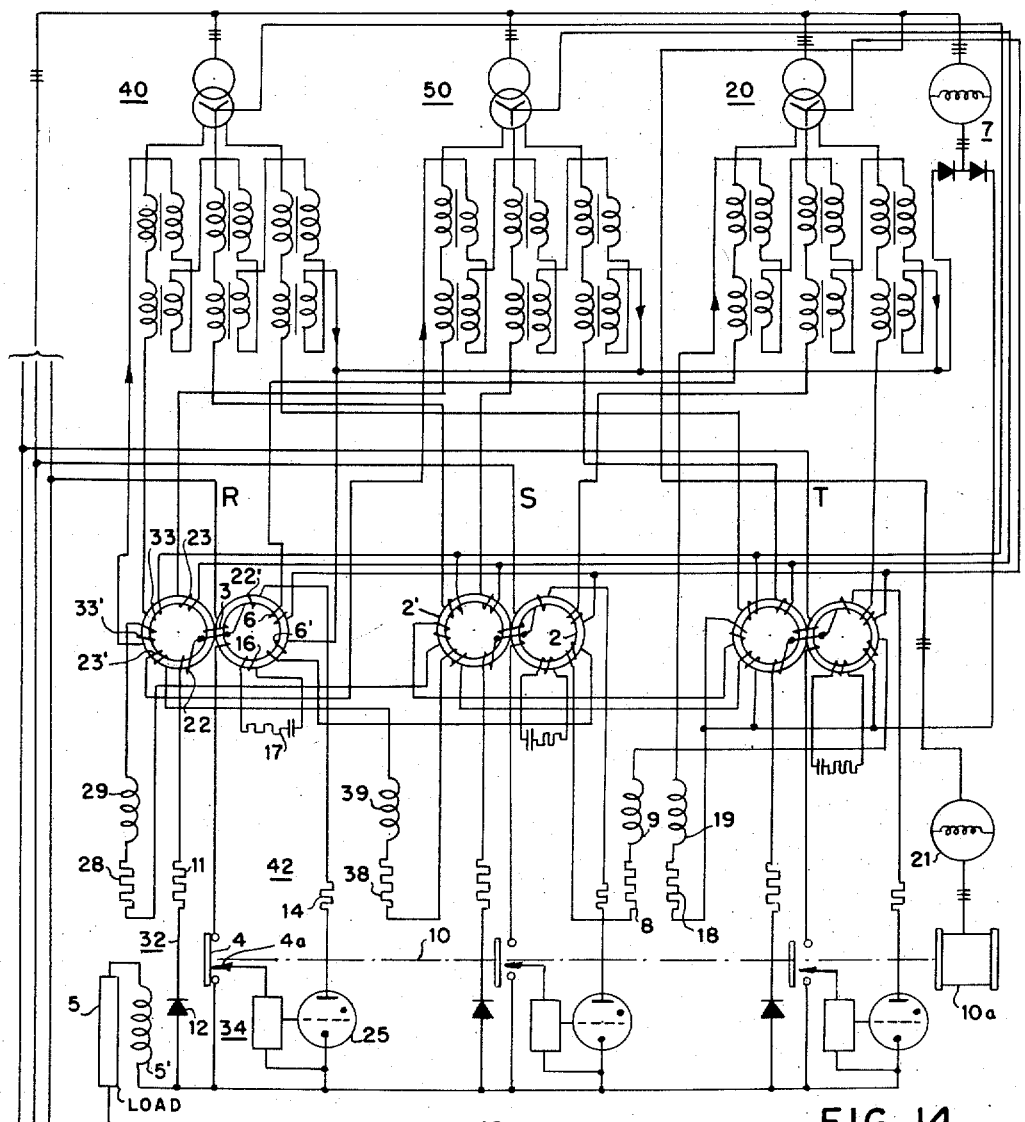
Figure 14A:
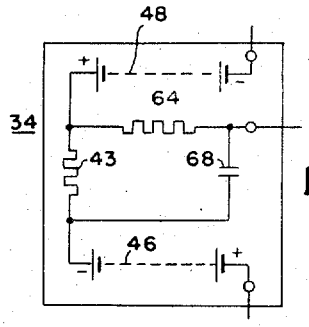
Fig. 14*a* shows separately a circuit detail of the converter according to Fig. 14.

The converter shown in Fig. 14 exemplifies the back-magnetization features explained in the foregoing. The illustrated converter has a three-phase Y-connected circuit energized from the secondary winding 1 of a power transformer whose primary 1' has its terminals R', S', T', connected to a three-phase supply line. Connected to the secondary side are the three phases R, S, T of the converter circuit. The three phase circuits have the same design. For simplicity, the pertaining reference characters are indicated in only one of the phases. Each phase comprises the main winding 3 of a commutating reactor in series with a synchronous converter contact 4 driven, for instance, by an actuating device 10 from a synchronous motor 10a to periodically close and open in the rhythm of the alternating phase voltage. The load circuit is represented by a load device 5 in series with a smoothing reactor 5'.

Each commutating reactor has a break core 2 and a separate make core 2'. The main reactor winding 3 is inductively coupled with both cores, and each core is additionally equipped with several auxiliary windings. While the magnet cores themselves are omitted from the drawing, a dot-and-dash enclosure shown for each reactor core of the phase S indicates which of the auxiliary windings are inductively linked with the break core 2 and which other auxiliary windings are linked with the make core 2'. Besides, the manner of illustration is so chosen that the current flow direction in the windings also indicates the direction of the magnetomotive force produced in the pertaining cores. The downward direction on the drawing is taken as "positive."

Four auxiliary windings 6, 6'', 16 and 22' are linked only with the break core 2. Of these, the windings 6 and 6'' together supply an invariable component $V_{A-}$ of the break premagnetization and also the back-magnetization $V_{RA}$ of the break core. The winding 6 is series connected with the active winding of an asymmetrical series transductor 20 which is attached to the energizing phase leads R, S, T through a phase-shift device here exemplified by an adjustable phase-shift transformer. The winding 6 is further combined with the corresponding windings of the two other phases to form a Y-connection. The direct-current windings of the transductors, as apparent from the drawing, are series connected in pairs, the two windings of each pair having a mutually opposed poling. These direct-current windings are energized from a direct-current source 7 shown, for example, as a barrier-layer rectifier arrangement energized from phase leads R, S, T through an auxiliary transformer. The direct-current circuit is stabilized by a reactor 19. The two transductor portions of each phase have different ratios of winding turns (transformer ratios), this being indicated in the drawing by different lengths of the symbols for the direct-current windings. In transductor 20 the upper portion is positively pre-excited by the direct current to a larger degree than the negatively pre-excited lower portion. Consequently, this transductor supplies alternating pulses whose positive wave is lower and longer than the negative wave. The winding 6 is so connected that the polarities are reversed. Hence, winding 6 produces a short and high positive pulse which effects the remagnetization, and a long pulse which negatively premagnetizes the break core during the predominant portion of each cycle period and in the sense of readiness for break performance. By a suitable choice of the transformer ratio of the two transductor portions, the positive back-magnetizing pulse can be made to extend over only about 60° electrical. For this purpose, the transformer ratios must be related about 60:300=1:5. The phase portion (i. e. in the illustrated example the control of the phase-shift transformer pertaining to the device 20) is so adjusted that the back-magnetizing pulse is terminated shortly prior to the contact closing moment (see Fig. 15(*f*) explained below). The magnitude of the pulse is so chosen that the pulse suffices for completely back-magnetizing the break core from positive to negative saturation. The adjustment is effected by changing the direct current with the aid of an adjusting resistor 13. This adjustment also determines the magnitude of the negative pulse in the premagnetizing winding 6. The latter pulse magnitude, in general, is not sufficient for the fixed component $V_{A-}$ of the break premagnetization which is supposed to correspond to the value $H_0$ in Fig. 1. However, the missing amount of negative magnetomotive force is supplied by the auxiliary winding 6'' which may also be connected to the direct current source 7 through an adjusting resistor 8 and a stabilizing reactor 9. The positive back-magnetizing pulse must be adjusted by a higher amount equal to the magnitude of this continuously effective negative magnetomotive force.

The make core 2' receives the fixed component $V_{E-}$ of the make magnetization through the windings 33 and 33'. Winding 33 is traversed by alternating pulses from the arrangement 40 of asymmetrical series transductors. The positive wake portion of these pulses is higher and shorter than the negative portion because the upper half of the transductors, which determines the positive pulse-wave portion, is more strongly pre-exicted than the lower transductor portion. In winding 33 the negative wave of this pulse is just balanced by an additional positive current through the pertaining winding 33'. To secure this balance, the winding 33' is series connected with the direct-current windings of the transductor device 40, and the turn number of winding 33' is related to that of winding 33 in the same ratio as the direct-current to alternating-current transformation ratio of the lower transductor half-section to the corresponding transformation ratio of the upper transductor half-section. In this manner the resultant effect of the winding group 33, 33' is a unipolar, positive pulse, acting in the sense of the make performance and having a duration, with respect to the remaining length of a cycle period, determined by the above-mentioned ratio of the turn numbers, i. e. the transformation ratio of the two transductor half-sections. The magnitude of the pulse is adjustable by the resistor 28 in the direct-current circuit. This direct-current circuit is also equipped with a stabilizing reactor 29. The duration and the phase position of the make magnetization are to be chosen so that the pulse extends at least over the range of phase positions that the make step may occupy during the normal operation of the converter (see Fig. 15(*e*) explained below). This is obtained by a corresponding dimensioning of the turn numbers of the transductor windings or/and a corresponding selection of the phase position of the supplied auxiliary voltage, for instance as illustrated, by means of the phase-shift transformer pertaining to the device 40.

For back-magetizing the make core 2' a unipolar pulse in the negative direction is applied with the aid of windings 23 and 23'. Winding 23 receives alternating pulses from the transductor device 50. Winding 23' receives direct current, as it is series connected with the direct-current excitation windings of the transductor device 50, and has its turn number dimensioned in the above-described manner relative to the winding 23. The phase position of the negative back-magnetizing pulse for make core 2' may be chosen that this pulse immediately follows the latest operationally possible time position of the break step. The corresponding direct-current circuit contains an adjusting resistor 38 and a stabilizing reactor 39.

The voltage-dependent component $V_{E\sim}$ of the make magnetization is supplied by an auxiliary circuit with a valve 25 and an adjusting resistor 14. This circuit is attached to the midpoint of the main winding 3 of the commutating reactor and includes a decoupling winding 22' disposed on the break core 2 and acting on this core in opposition to the magnetization effected by the upper half of winding 3. The valve 25 is shown as a grid-controlled tube. The grid circuit 34 of tube 25 may have any suitable design, for instance, the one separately illustrated in Fig. 14*a*. The grid circuit, as shown, is connected to a preclosing contact 4'' so that the voltage responsive component $V_{E\sim}$ of the make magnetization commences each time shortly before the closing moment of the main contact to act with a positive direction in the upper half of the commutating reactor winding 3. In the grid circuit design exemplified by Fig. 14*a*, a source 46 of grid bias voltage serves to apply a negative cut-off potential. Another source 48 of a higher voltage changes the resultant grid potential to a positive magnitude for firing the tube 25 as soon as the contact **4*a* closes. The grid circuit further includes a current limiting resistor 43, a capacitor 68 and a damping resistor 64**.

For producing the voltage responsive component $V_{A\sim}$ of the break magnetization, an auxiliary circuit with an adjusting resistor 11 and a preferably non-controllable (two-electrode) valve 12 is provided. This auxiliary circuit is also connected with the midpoint of the common reactor main winding 3 and extends through a decoupling winding 22 linked only with the make core 2'. Due to the chosen flow direction of the valve, this auxiliary circuit comes into action during the break step. Further details of the functioning of the auxiliary circuits for the voltage-responsive premagnetizating components $V_{E\sim}$ and $V_{A\sim}$ are presented below in conjunction with Fig. 15.

Each of the two cores 2 and 2' may further be equipped with one of the above-mentioned shaping circuits. Such a shaping circuit is illustrated, by way of example, for the break core and is denoted by 17. This shaping circuit is connected to the auxiliary winding 16 of the commutating reactor.

Figure 15:
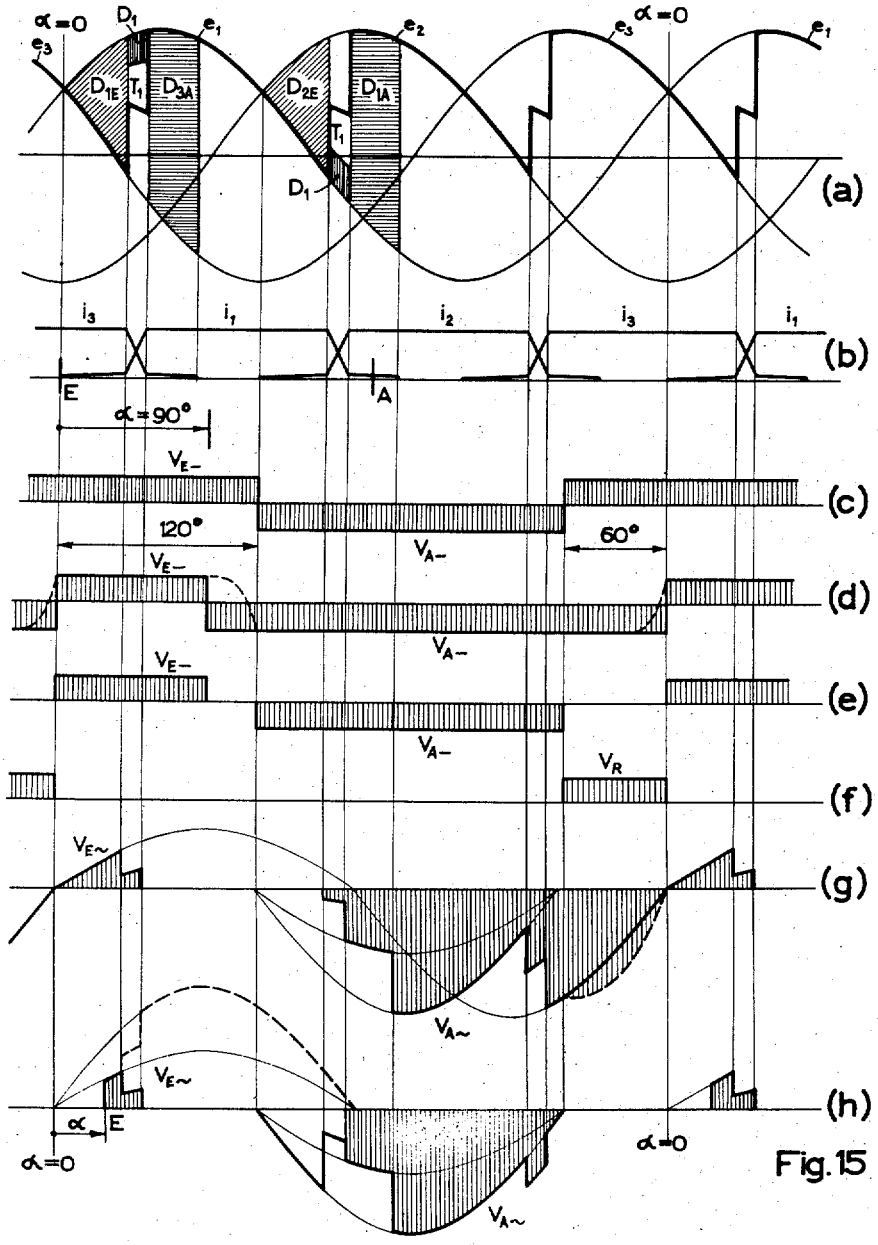
Fig. 15 illustrates eight explanatory coordinate diagrams (*a*) to (*h*) of current and voltage conditions typical for converters according to Figs. 14 to 18.
Figure 16:
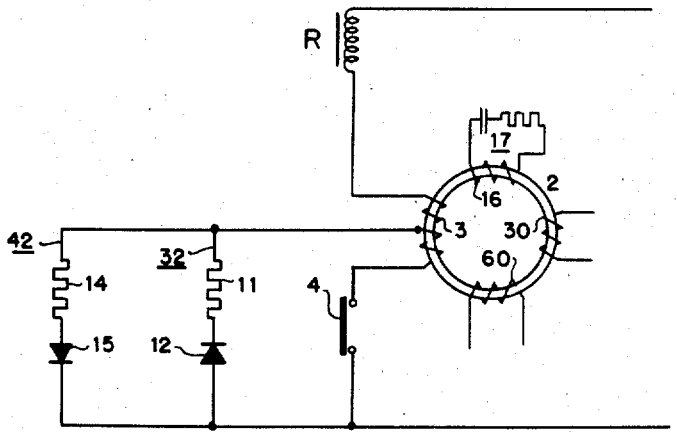
Figure 17:
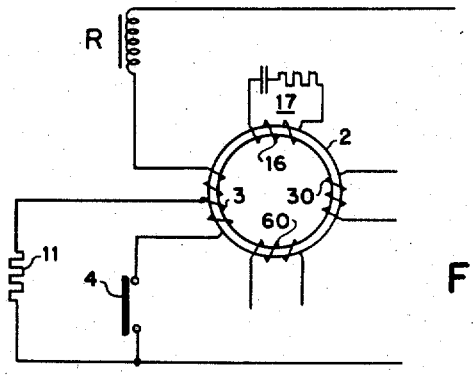
Figure 18:
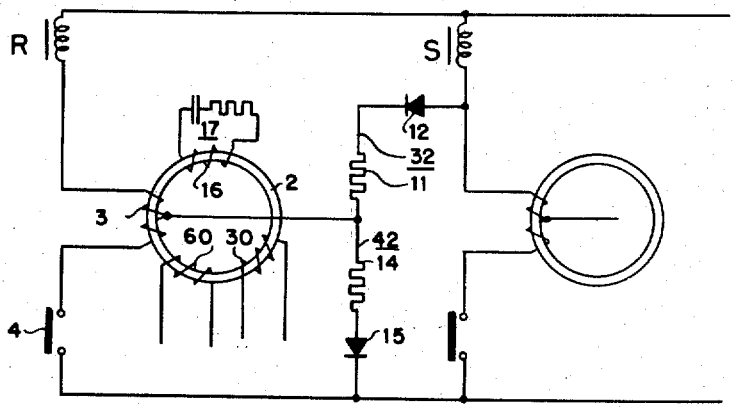

Figs. 16 to 18 show three respective modifications by partial illustrations. In these modifications each commutating reactor has only one core for producing the current steps for the break performance as well as for the make performance. These modifications may not only be used in a three-phase Y-connection as illustrated, but are also applicable without change in a three-phase bridge (full-wave) connection with six reactors; and they are also adaptable for other converter connections with one contact per commutating reactor. The converter contacts may be driven by synchronous motors or may be controlled electromagnetically as described in the foregoing. The modifications of Figs. 16 to 18 relate to converters for an exclusively magnetical voltage regulation. Circuit adaptations for voltage regulation by magnetical and mechanical control will be referred to in a later place. The corresponding time characteristic of the voltages and currents in the illustrated converter circuits are schematically represented in Fig. 15.

In Figs. 16 to 18, the means for supplying the fixedly predetermined components of the make and break premagnetization for each phase are symbolically indicated as a winding 60. The winding symbol 60 is meant to denote any of the previously described devices for producing a resultant magnetomotive force of alternating direction with a preferably rectangular curve shape. As apparent from the foregoing, the production of such a magnetomotive force may require several auxiliary windings on the commutating reactor core. In this sense, therefore, the symbol 60 may denote a single winding as well as a group of several coacting windings.

The illustrated embodiments are further equipped with another premagnetizing winding or winding group 30 on the commutating reactor in each phase for controlling the back-magnetization as described in the foregoing.

Before dealing with further details of the just-mentioned modifications, it appears preferable to first discuss the phase conditions of the premagnetizing components in converter connections of the type shown in Figs. 14 and 16 to 18 will be further explained with reference to Fig. 15. Fig. 15(*a*) represents the time curves of the Y-voltages $e_1$, $e_2$, $e_3$ in the respective phases R, S, T of the power transformer. Fig. 15(*b*) shows schematically the typical wave shape of the load currents $i_1$, $i_2$, $i_3$ which pass through the commutating reactor main winding and the series-connected converter contact in the respective phases. In the illustrated example, the voltage control angle $\alpha$, extending from the intersection of any two successive phase-voltage curves to the moment at which the two respective load currents commence to overlap, amounts to about 40° $e_1$. In the case of a magnetic voltage regulation, the entire angle interval is occupied by the make step. In Fig. 15(*a*) the voltage area $D_{1E}$ is correlated to this make step in the phase R. The direct-current voltage at that time still follows the curve $e_3$.

Immediately following the make step is the overlapping interval of the load currents. During this interval the direct voltage is in accordance with the middle curve between the voltages $e_3$ and $e_1$. The voltage area $D_1$ remains maintained by the inductivity of the saturated commutating reactor of phase R, while the voltage area $T_1$ is maintained by the transformer and line inductivity of the same phase. Thereafter, the current $i_3$ enters into the break step. From now on, the direct voltage corresponds to the curve $e_1$. During the break step interval the voltage area $D_{3A}$ is effective at the commutating reactor of phase T. During the subsequent current commutation from phase R to phase S, the same phenomena reoccur in a corresponding cyclical substitution. The voltage areas $D_1$ of the commutating reactor and $T_1$ of the transformer phase R now lie below the middle curve of the direct voltage. While this is of no concern for the constant component of premagnetization, it is significant for the following consideration of the time course of the voltage-dependent break premagnetization.

Fig. 15(*c*) shows the curve of the magnetomotive force for the application of a symmetrical transductor. The interval of the invariable component $V_{A-}$ of break premagnetization must begin not earlier than at 90° and not later than at 120°. After a duration of 180°, this interval passes at 270° to 300° into the interval of the invariable component $V_{E-}$ of make premagnetization. Since the make interval begins ahead of the time point $\alpha=0$, the magnitude of the fixedly predetermined magnetomotive force must not exceed the value required for the static remagnetization ($H_s$ in Fig. 1) to prevent causing an undesired, premature back-magnetization. The back-magnetization should exclusively be controlled by the back-magnetizing pulse $V_R$ which takes place in the time interval from the end of the break premagnetization $V_{A-}$ to the time point $\alpha=0$, as is represented in Fig. 15(*f*).

Fig. 15(*d*) shows one of the possible courses of the fixed premagnetizing magnetomotive force for the case that in one of the above-mentioned converter connections an asymmetrical series transductor is used, possibly with an additional compensation of the negative curve portions. The interval of the make premagnetization $V_{E-}$ in this case commences at the point $\alpha=0$ or shortly ahead of this point, and terminates at about 90°, then to be followed by the interval of the break premagnetization $V_{A-}$ which occupies the entire rest of the cycle period. The back-magnetizing pulse has the phase position shown in Fig. 15(*f*) but, in this case, must be considerably higher as corresponds to the case of Fig. 15(*c*) because the pulse must now balance the break premagnetization and must additionally furnish the magnitude corresponding to the invariable make premagnetization. If, instead of a transductor circuit, a rectifier connection with 120° anode-current duration is employed for producing the premagnetizing magnetomotive force, then the interval of the make premagnetization has the course entered in Fig. 15(*d*) by a broken line.

Fig. 15(*e*) represents the time curve of the invariable premagnetizing components $V_{E-}$ and $V_{A-}$ as they would occur when unipolar pulses of mutually opposing polarity are employed for the make and break performance as described in the foregoing. In this case, the back-magnetizing pulse $V_R$ need no longer balance the component break magnetization and hence may have a smaller magnitude than in the case represented by Fig. 15(*d*).

The above-described behavior is common to the circuits according to Figs. 16 to 18. The differences between these circuits lie essentially in the arrangement of the devices for providing the voltage-responsive premagnetizing components $V_{E\sim}$ and $V_{A\sim}$. In the circuits of Figs. 16 to 18, which as mentioned apply to exclusively magnetic voltage regulation, the voltage-responsive premagnetizing circuits include only non-controlled (two-electrode) valves 15 or no valves at all, as the inception of the current for the voltage-responsive make premagnetization practically coincides with the contact-closing moment occurring at the time point $\alpha=0$ or only a few degrees after that point. In circuit arrangements, however, which are also intended to operate with a voltage regulation by mechanical delay-angle control, the circuits for the voltage responsive make premagnetization must be equipped with controlled valves in order to prevent the premature expiration of the make step that may otherwise occur under the influence of both make premagnetizing components $V_{E-}$ and $V_{E\sim}$.

In the embodiment of Fig. 16, two separate adjusting resistors 14 and 11 are provided for the voltage-responsive make premagnetizing circuit and for the voltage responsive break premagnetizing circuit respectively. This is necessary if, for optimum adaptation, the components $V_{E-}$ and $V_{A-}$ have different magnitudes. The time curve of the currents in the two voltage-responsive premagnetizing circuits is represented in Fig. 15(*g*). The make-premagnetizing current, proportional to the component $V_{E\sim}$, commences at the time point $\alpha=0$ in which the phase voltages $e_3$ and $e_1$ are equal. Thence, this premagnetizing current increases during the make step proportionally to a sine curve (not separately illustrated) corresponding to the voltage difference $e_{13}$ between $e_1$ and $e_3$. The pertaining voltage area is indicated in Fig. 15*a* at $D_{1E}$. It should be noted that only half of the voltage $e_{13}$ occurs at the premagnetizing circuit here under observation if this circuit, as illustrated, is attached to the midpoint of the commutating reactor main winding 3. During the overlapping interval of the load currents, the premagnetizing current declines to a curve corresponding to the inductive voltage at the saturated commutating reactor of phase R, the pertaining voltage area being indicated in Fig. 15(*a*) at $D_1$. When the current commutation is completed, the premagnetizing current ceases because then no voltage remains effective across the commutating reactor winding 3 of phase R.

The break premagnetizing current corresponding to component $V_{A\sim}$ commences at the moment when due to the current commutation of load currents $i_1$ and $i_2$ an inductive voltage of the opposite polarity occurs at the commutating reactor of phase R, the corresponding voltage area being denoted by $D_1$ in Fig. 15(*a*). After termination of the current commutation, this premagnetizing current rises to a value proportional to the commutating-reactor voltage obtaining during the break step. During this step, the commutating reactor has a voltage drop $e_{21}$ (not separately illustrated) between $e_2$ and $e_1$ corresponding to the voltage area $D_{1A}$ in Fig. 15(*a*). Accordingly, half of the voltage $e_{21}$ is effective in the premagnetizing circuit here concerned. After termination of the break step, the premagnetizing current follows the course of voltage $e_{21}$, however with a doubled magnitude because now the ohmic resistance of the premagnetizing circuit is no longer impressed by half the cut-off voltage $e_{21}$ but, upon saturation of the commutating reactor, is subjected to the full value of this voltage. The premagnetizing current then runs according to the curve of the voltage $e_{21}$ up to the end of the cycle period. During the last interval which is available for a back-magnetization, for instance according to Fig. 15(*f*), an additional voltage is superimposed upon the sinusoidal basic curve of the cut-off voltage $e_{21}$. The superimposed voltage corresponds to half the voltage occurring at the commutating reactor during the back-magnetization, assuming that the back-magnetizing pulse has the effect of anticipating part of the break interval prior to the moment $\alpha=0$. The just-mentioned voltage superposition is indicated in Fig. 15(*g*) by a broken line.

The embodiment of Fig. 17 differs from that of Fig. 16 in that only one resistor 11 is employed for the two voltage-responsive premagnetization components $V_{E\sim}$ and $V_{A\sim}$ and that the two valves 12, 15 of Fig. 16 are omitted. This is permissible if the components $V_{E-}$ and $V_{A-}$ have the same magnitudes corresponding to the value $H_0$ in Fig. 1. This, in turn, requires that $V_{E-}$ commences only at the moment $\alpha=0$ as in Figs. 15(*d*) and 15(*e*). With time curves of the invariable premagnetizing components as represented in Fig. 15(*c*), the magnetic-force value ($H_0$ in Fig. 1) required for the static premagnetization must not be exceeded by the resulting total magnetizing magnetomotive force of the particular commutating reactor prior to the moment $\alpha=0$ if a premature back-magnetization is to be avoided. The operating characteristics for the converter according to Fig. 17 correspond to those described with reference to Fig. 16.

In the embodiment of Fig. 18, the circuit for the voltage-responsive break premagnetization $V_{A\sim}$, instead of being connected as an along-phase circuit, is given a cross-phase connection by attaching it to the circuit of the next incipient phase at a point between the transformer winding 1 and the commutating reactor winding 3. This has the advantage of smaller premagnetizing losses as is apparent from the current curve shown in Fig. 15(*h*). Although the premagnetizing current in this case commences already at the moment $\alpha=0$ and although it first follows a sine curve corresponding to the full interphase voltage across the resistance of the premagnetizing circuit, it thereafter assumes values during the overlapping interval of the load currents whose magnitudes amount to about three times the current values in the same interval of the current curve according to Fig. 15(*g*). Subsequently, the premagnetizing current, during the step interval and shortly thereafter, has at first the same course as the curve of Fig. 15(*g*) up to the beginning of the overlapping interval of currents $i_2$ and $i_3$. From that point on the premagnetizing current increases further only in accordance with the inductive voltage of the transformer winding in phase S. After termination of the current commutation, the premagnetizing current again follows the above-mentioned sine curve to its zero value. Thereafter the entire following interval up to the next zero moment ($\alpha=0$) is free of current, provided the back-magnetizing voltage across half of the commutating reactor main winding does not now again exceed the positive voltage $e_{12}$.

The circuit for the voltage-responsive make premagnetization $V_{E\sim}$ in Fig. 18 is identical with the corresponding circuit shown in Fig. 16. Therefore the current curve in this circuit is in accordance with the make portion of the curve shown in Fig. 15 (*g*).

The effective value (average value) of the premagnetization current according to Fig. 15(*h*) is smaller than the corresponding current value of Fig. 15(*g*), the difference increasing with a downward regulation of the rectified output voltage. The resulting smallness of the losses makes this connection of the two voltage-responsive premagnetizing circuits generally preferable, irrespective of other circuits for back-magnetizing or other premagnetizing components, for application in contact converters whose type of contact-actuating or contact-control means secures an overlapping of the contact closing periods in sequentially conductive phases, as is the case, for instance, in converters with motor-driven contacts. This preference is not limited to bridge connections (full-wave contact rectifiers) as exemplified by the three-reactor connection mentioned in the foregoing but applies generally to converter circuits whose operation always involves an overlapping of the contact closing periods.

If, in accordance with Figs. 14, the two-electrode valve 15 in the embodiment of Fig. 16 is replaced by a controllable valve (25 in Fig. 14) with a mechanical delay-angle control for voltage regulation, then the premagnetizing current starts flowing at the closing moment E of the contact, which in this case is delayed by the control angle $\alpha$, or shortly ahead of this moment if a pre-closing contact is used for controlling the valve. The flow of premagnetizing current terminates after cessation of the overlapping load-current interval, as is represented in Fig. 15(*h*) by the cross-hatched portion of the make period.

If, further, for instance in a three-reactor connection, the circuits for the voltage-responsive make premagnetization are also equipped with controlled valves, these circuits being then cross-phase connected by attachment to the sequentially next-preceding phase, then the premagnetizing current at first follows the same course as in the make portion of Fig. 15(*h*). Thereafter, however, this current continues along the sine curve indicated by a broken line, until this curve reaches the zero value. It will be recognized that the power consumption of such an arrangement is larger than with an along-phase connection of the voltage-responsive make premagnetizing circuits. The latter connection therefore deserves preference.

A circuit design employing cross-phase connections for the voltage-responsive make premagnetization is possible only when separate reactor cores in the commutating reactors are employed for the make step as is the case with the above-mentioned three-reactor connection.

The design of the premagnetizing circuits with all four components (or with a fifth component for back-magnetization) satisfies the most exacting requirements. If lesser requirements are sufficient, the converter design may be simplified by eliminating some of the accessory circuits. This applies particularly to the circuits for control of the make operation because then a less accurate turning does not directly impair the reliability of operation. Even with respect to the break performance, an accurate tuning may be unnecessary in certain cases, namely when, for instance, additional shunt paths, known as such, are provided across the converter contacts. However, during break performance an accurate tuning assures a lesser transfer of contact material than can be achieved when the make step is raised above the zero line and a shunt path lies across the contact.

In some cases, for instance, with a voltage regulation by mechanical delay-angle control, the voltage-responsive make premagnetization component may be dispensed with if the make step has a sufficient duration and hence is accompanied by a small premagnetizing velocity. This is the case, for instance, with a conjoint application of a mechanical and magnetical voltage control.

It should be noted that the magnitude of the resultant pulse of magnetomotive force is always given by the velocity of magnetization reversal in accordance with the characteristic shown in Fig. 1 and hence is affected by the voltages impressed upon the auxiliary windings of the commutating reactor, this being also true with respect to the above-described back-magnetization phenomena. Consequently, for instance, an increase in pulse magnitude by changing the exciting direct current in the transductor arrangement is effective only to such an extent as it is capable of producing an increase in remagnetizing velocity of the pertaining commutating reactor. This requires selecting the auxiliary voltage for energizing the particular transductor arrangements with a sufficiently high magnitude and also giving the stabilizing reactor of the pertaining direct current excitation circuit a sufficiently ample dimensioning.

The just-mentioned requirement arises from the fact that the coaction of several saturable series reactors always involves a reaction of these reactors upon each other, and that among these the reactance device of the largest stiffness is predominantly controlling. The reactor stiffness is essentially determined by the stabilizing reactance in its direct-current excitation circuits. Each stabilizing reactor is a storer for voltage-time integrals (voltage areas) and, by issuing these integrals, renders the pertaining saturable reactor capable of impressing the variation of its magnetic condition, and hence the corresponding current characteristic, upon the circuit connected to the reactor, thus enforcing a corresponding magnetic variation in the other saturable reactor of the same circuit. This explains why a seemingly auxiliary circuit element in a direct-current circuit, namely the stabilizing reactor, may actually have an essential effect upon the behavior of the main reactor circuit and hence requires attention for securing best results.

As explained, a change in the pulse duration may be effected by changing the transformation ratio in one of the two half-sections of the asymmetrical series transductor devices. For the purpose of a subsequent variation, therefore, at least one of the four windings in each phase of a transductor device may be equipped with selectively switchable tap points. In this manner the flux ratio of one half-section of the transductor is made variable. The same result can be attained by varying the pre-excitation in at least one of the transductor half-sections. To this end, an additional circuit is to be parallel connected to one of the two series-arranged direct-current windings of the transductor, or the direct-current windings of the same phase are to be connected parallel to each other instead of in series. In both cases, each of the respective parallel circuits should be equipped with an adjusting resistor and a sufficiently large stabilizing reactor.

The described variation in the duration or effective voltage magnitude of the back-magnetizing pulse, whose coaction results into the voltage-time integral essential for the remagnetization, permits shortening the make step to an adjustable extent thus varying the length of the residual make interval occurring after the contact closing moment (the length of the step being here understood to mean the relative length referring to a definite voltage value, usually the peak value of the commutating voltage). Different lengths of the residual make step, of course, connote correspondingly different angles or degrees of voltage control. Consequently, such a variation affords the possibility of voltage regulation by magnetic control.

On the other hand, it is often desired, in connection with voltage regulation by mechanical control, to have a make step of the same absolute length regardless of changes in control angle. This requires that with full control (zero control angle) a larger back-magnetizing voltage-time integral must be effective than with partial control (finite control angle) because of the only slight values of the commutation voltage prevailing at full control. An automatic regulation of this type, with the application of the above-described control means, may be effected, for instance, by electrically or mechanically coupling these control means with the device for regulating the voltage control angle, or by having these control means operated by an electric circuit connection in dependence upon variations in the phase position of the contact closing moment.

I claim:

1. A electric contact converter, comprising alternating-voltage supply means, a converter circuit connected to said supply means, said converter circuit comprising contact means synchronous with said alternating-voltage supply means and a saturable commutating reactor, the main winding of said reactor being series-connected with said contact means for producing in said circuit a current step near the current zero value, said reactor having premagnetizing means comprising two component premagnetizing circuits, one of said premagnetizing circuits being operative to provide a substantially constant direct current during said current step, and said other premagnetizing circuit being operative to provide a current proportional to the voltage across said series-connected main winding of said reactor, said two component premagnetizing circuits being so polarized with respect to each other that the magnetomotive forces produced in said reactor by their respective currents are additive.

2. In a converter according to claim 1, said one premagnetizing circuit comprising pulse generating means connected with said alternating-voltage supply means and operative to provide a current-pulse wave synchronous with the alternating voltage of said supply means and having a substantially constant amplitude during said current step.

3. In a converter according to claim 1, said one premagnetizing circuit being connected to said alternating-voltage supply means to be energized therefrom and comprising asymmetrically conductive means for conducting during each alternating-voltage period a current pulse of substantially constant amplitude.

4. In a converter according to claim 1, said one premagnetizing circuit being connected to said alternating-voltage means to be energized therefrom and comprising a unidirectionally pre-excited saturable reactor and a valve series-connected with each other for conducting during each alternating-voltage period a current pulse of substantially constant amplitude.

5. In a converter according to claim 1, said other premagnetizing circuit comprising resistance means and being connected parallel to the series connection of the main winding of said commutating reactor and said contact means to be energized by the voltage across said series connection.

6. In a converter according to claim 1, said other premagnetizing circuit comprising a valve and a resistor series-connected with each other and being connected parallel to a portion of said converter circuit including the main winding of said commutating reactor and said contact means.

7. An electric contact converter, comprising alternating-voltage supply means, a converter circuit having a plurality of phase circuits connected to said supply means, said converter circuit comprising two direct-current buses of positive and negative polarities respectively, each of said phase circuits having a pair of contacts mutually 180 electrical degrees phase displaced and connected to said two buses respectively, said contacts being adapted for synchronous operation with respect to said alternating-voltage supply means, each of said phase circuits having a single saturable commutating reactor having a main winding series-connected with its respective pair of contacts for producing a current step interval near the current zero value, each of said reactors having two component premagnetizing circuits, one of said premagnetizing circuits being operative to provide a substantially constant direct current during said current step, and said other premagnetizing circuit being operative to provide a current varying as a function of the voltage across the main winding of its respective reactor, said two component premagnetizing circuits being so polarized with respect to each other that the magnetomotive forces produced in their respective reactor by said respective currents are additive.

8. A converter according to claim 7, comprising a saturable make core and a saturable break core, said main winding being inductively linked with said two cores, said two cores having separate premagnetizing windings respectively, said two premagnetizing windings being series connected with each other in said one premagnetizing circuit so that the current in said latter circuit premagnetizes said make core as well as said break core, and two saturable and opposingly direct-current excited reactors series-connected with each other and in said one premagnetizing circuit.

9. In an electric contact converter according to claim 8, said premagnetizing winding of said make core having a lesser number of turns than said series-connected premagnetizing winding of said break core.

10. In a converter according to claim 7, said commutating reactor comprising a make core inductively linked with said main winding and having a premagnetizing winding on said core, said other premagnetizing circuit having a portion which includes said premagnetizing winding and is connected to a point of said converter circuit between said main winding and said alternating-voltage supply means, and said other premagnetizing circuit having two parallel branches extending from said portion to the respective direct-current sides of said two contacts of said pair, each of said two branches comprising a controllable valve and a resistor series-connected with each other.

11. An electric contact converter, comprising alternating-voltage supply means, a converter circuit connected to said supply means, said converter circuit comprising contact means adapted for synchronous operation with said alternating-voltage supply means, and a saturable commutating reactor having a main winding series-connected with said contact means for producing a current step near the current zero value, said reactor having premagnetizing means comprising two component premagnetizing circuits, one of said component circuits comprising a direct-current source of constant voltage operative to provide said reactor with a constant component magnetomotive force during said current step, and said other component circuit comprising supply means operative to provide a variable current proportional to the voltage across the main winding of said reactor during said current step to provide said reactor with a variable component magnetomotive force, said two circuits being so polarized with respect to each other that said two component magnetomotive forces are additive during said current step.

12. An electric contact converter, comprising an alternating-voltage supply means, a synchronous converter contact synchronous with said alternating-voltage supply means, a commutating reactor having a saturable core and having on said core a main winding connected to said supply means in series with said contact to produce near zero current a current-step interval for switching operation of said contact, said core having two premagnetizing windings, a first premagnetizing circuit including one of said premagnetizing windings and operative to provide a substantially invariable current during said interval, and a second premagnetizing circuit including said other premagnetizing winding and being connected parallel to the series connection of said contact and said reactor main winding to be traversed during said interval by premagnetizing current variable in dependence upon the voltage at said main winding, said two premagnetizing circuits being poled for cumulative premagnetizing action during said interval.

13. An electric contact converter, comprising alternating-voltage supply means, a synchronous converter contact synchronous with said alternating-voltage supply means, a commutating reactor having a saturable core and having on said core a main winding connected to said supply means in series with said contact to produce near zero current a current-step interval for switching operation of said contact, a premagnetizing winding on said core, a premagnetizing circuit including said premagnetizing winding and operative to provide during said interval a substantially invariable premagnetizing current, said reactor main winding having a tap and having one winding portion between said tap and said contact and another winding portion between said tap and said supply means, circuit means connected to said tap and extending from said tap across the series connection of said first winding portion and said contact, said circuit means forming together with said second winding portion another premagnetizing circuit operative to provide during said interval a premagnetizing current variable in dependence upon the voltage at said main winding, said two premagnetizing circuits having a poling at which the respective component magnetomotive forces produced thereby are cumulative during said interval.

14. An electric contact converter, comprising polyphase alternating-voltage supply means, a converter circuit having a plurality of sequentially operative phase circuits connected to said supply means and having synchronous converter contacts synchronous with said alternating-voltage supply means in said respective phase circuits, a commutating reactor for each of said respective contacts, each of said reactors having a saturable core and having on said core a main winding connected in series with said contact to produce a break-step interval near the current zero value at the end of the conductive period of said contact, said reactor having two coactive premagnetizing circuits, one of said premagnetizing circuits being operative to provide during said break-step interval a substantially invariable current, said other premagnetizing circuit having a resistor and a valve series-connected with each other and being operative to provide during said break-step interval a premagnetizing current variable in dependence upon the voltage at said main winding, said two premagnetizing circuits having relative to said main winding a poling at which the magnetomotive forces produced in said core by said respective premagnetizing currents jointly oppose during said break-step interval the magnetomotive force caused by the flow of converter load current in said main winding.

15. In a converter according to claim 14, said reactor main winding having a tap point, and said other premagnetizing circuit being parallel connected to a portion of one pertaining phase circuit, said portion extending from said tap point to across said contact.

16. In a converter according to claim 14, said valve being controllable and having a control circuit inductively linked with said reactor to release said valve at the beginning of said interval.

17. An electric contact converter, comprising polyphase alternating voltage supply means, a converter circuit having a plurality of sequentially operative phase circuits synchronous with said alternating-voltage supply means connected to said supply means and having synchronous converter contacts in said respective phase circuits, a commutating reactor for each of said respective contacts, each of said reactors having a saturable core and having on said core a main winding connected in series with said contact to produce a break-step interval near the current zero value at the end of the conductive period of said contact, said reactor having two coactive premagnetizing circuits, one of said premagnetizing circuits being operative to provide during said break-step interval a substantially invariable current, said other premagnetizing circuit being operative to provide a variable premagnetizing current responsive to the voltage at said main winding and comprising a premagnetizing winding on said reactor core, said other premagnetizing circuit extending from a point between the reactor main winding and the supply means in one phase circuit to a point between the reactor main winding and the supply means in the next sequential phase circuit.

18. An electric contact converter, comprising alternating-voltage supply means, a converter circuit connected to said supply means and having synchronous contact means operative to be close-circuited during a given half-wave period of the voltage cycle, a reactor device having saturable core means and having main winding means series-connected with said contact means for producing respective weak-current make and break steps at the beginning and at the end respectively of each close-circuited period of said contact means, and premagnetizing circuit means inductively linked with said core means and operative to provide during each of said make and break steps a magnetomotive force comprising a substantially constant component and a variable component responsive to the voltage at said main winding, said circuit means having a premagnetizing circuit connected parallel to a portion of said converter circuit including the series connection of said contact means with at least part of said main winding.

19. An electric contact converter, comprising alternating-voltage supply means, a converter circuit connected to said supply means and having synchronous contact means synchronous with said alternating-voltage supply means and a saturable commutating reactor series-connected with said contact means for producing near the current zero value a make-step interval at the start of the closing period of said contact, said reactor having two component premagnetizing means operative to produce two respective component electromotive forces, one of said premagnetizing means being operative to produce substantially constant ampere turns during said step interval, and said other premagnetizing means being operative to produce during said step interval variable ampere turns dependent upon the voltage obtaining at said reactor, said two premagnetizing means having respective polings at which said respective magnetomotive force components during said make-step interval have both the same direction as the magnetomotive force caused by the converter load current in said reactor immediately after cessation of said make-step interval.

20. An electric contact converter, comprising polyphase alternating-voltage supply means, a converter circuit having a plurality of sequentially operative phase circuits connected to said supply means and having synchronous converter contacts synchronous with said alternating-voltage supply means in said respective phase circuits, a commutating reactor for each of said respective contacts, each of said reactors having a saturable core and having on said core a main winding connected in series with said contact to provide a make-step interval near the current zero value at the start of the closing period of said contact, said reactor having two coactive premagnetizing circuits, one of said premagnetizing circuits being operative to provide during said make-step interval a substantially invariable current, said other premagnetizing circuit having a resistor and a valve series-connected with each other and being operative to provide during said make-step interval a premagnetizing current variable in dependence upon the voltage at said main winding, said two premagnetizing means having respective polings at which said respective magnetomotive force components during said make-step interval have both the same direction as the magnetomotive force caused by the converter load current in said reactor immediately after cessation of said make-step interval.

21. In a converter according to claim 20, said other premagnetizing circuit being connected to the direct-current side of said contact and extending therefrom in parallel relation to a portion of said phase circuit including said contact and at least part of said reactor main winding.

22. In a converter according to claim 21, said valve in said other premagnetizing circuit having a control circuit and providing a conductive period controlled by said control circuit and commencing at a moment at most shortly ahead, and not later than, the closing moment of said contact.

23. An electric contact converter, comprising polyphase alternating-voltage supply means, a converter circuit having a plurality of sequentially operative phase circuits connected to said supply means and having synchronous converter contacts synchronous with said alternating-voltage supply means in said respective phase circuits, a commutating reactor for each of said respective contacts, each of said reactors having a saturable core and having on said core a main winding connected in series with said contact to provide a make-step interval and a break-step interval near the current zero passages at the beginning and end respectively of the conductive period of said contact, said reactor having two coactive premagnetizing circuits, one of said premagnetizing circuits being operative to provide during said break-step interval a substantially invariable current, said other premagnetizing circuit having a resistor and a valve series-connected with each other and being operative to provide during said break-step interval a premagnetizing current variable in dependence upon the voltage at said main winding, said two premagnetizing circuits having relative to said main winding a poling at which the magnetomotive forces produced in said core by said respective premagnetizing currents jointly oppose during said break-step interval the magnetomotive force caused by the flow of converter load current in said main winding, and said reactor having additional premagnetizing means effective during said make-step interval to provide during said make-step interval a magnetomotive force in the direction of that caused by said load current.

24. An electric contact converter, comprising polyphase alternating-voltage supply means, a converter circuit having a plurality of sequentially operative phase circuits connected to said supply means and having synchronous converter contacts synchronous with said alternating-voltage supply means in said respective phase circuits, a commutating reactor for each of said respective contacts, each of said reactors having a saturable core and having on said core a main winding connected in series with said contact to provide a make-step interval and a break-step interval near the current zero passages at the beginning and end respectively of the conductive period of said contact, said reactor having two coactive premagnetizing circuits, one of said premagnetizing circuits being operative to provide during said make-step interval a substantially invariable current, said other premagnetizing circuit having a resistor and a valve series-connected with each other and being operative to provide during said make-step interval a premagnetizing current variable in dependence upon the voltage at said main winding, said two premagnetizing means having respective polings at which said respective magnetomotive force components during said make-step interval have both the same direction as the magnetomotive force caused by the converter load current in said reactor immediately after cessation of said make-step interval, and said reactor having additional premagnetizing means effective during said break-step interval to provide during said break-step interval a magnetomotive-force direction opposed to that caused by said load current.

25. An electric contact converter, comprising alternating-voltage supply means, a converter circuit connected to said supply means and having synchronous contact means synchronous with said alternating-voltage supply means and a saturable commutating reactor series-connected with said contact means for producing a make-step interval and a break-step interval near current zero at the beginning and end respectively of the conductive period of said contact, said reactor having a plurality of premagnetizing means to produce two component magnetomotive forces during each of said two intervals, part of said premagnetizing means being operative to provide during said respective intervals a substantially constant magnetomotive force and another part of said premagnetizing means being operative to provide during said respective intervals a variable magnetomotive force depending upon the voltage at said reactor, said constant and variable component magnetomotive forces having during said make-step interval a direction coincident with the magnetomotive force caused in said reactor by the converter load current, and said constant and variable magnetomotive forces having during said break-step a direction opposed to the magnetomotive force caused by said load current.

26. An electric contact converter, comprising alternating-voltage supply means, a converter circuit connected to said supply means and having synchronous contact means synchronous with said alternating-voltage supply means and a saturable commutating reactor series-connected with said contact means for producing a current-step interval near the current zero value, said reactor having two coactive premagnetizing circuits, one of said premagnetizing circuits having a direct-current source to be energized thereby and comprising a stabilizing reactor, said other premagnetizing circuit being coupled with said alternating-voltage supply means to derive energizing voltage therefrom and comprising a transductor assembly having two saturable reactors, said two latter reactors being series-connected with each other and having mutually opposing direct-current excitation means respectively, whereby said two premagnetizing circuits produce in said commutating reactor respective magnetomotive forces cumulative during part of the cycle period and mutually opposed during the remaining part of said period.

27. In a converter according to claim 26, said one premagnetizing circuit having a direct-current magnitude at which said magnetomotive force due to said one premagnetizing circuit is substantially equal to the opposed magnetomotive force produced by said other premagnetizing circuit during the remaining part of said cycle period, so that the resultant magnetomotive force has the shape of a unidirectional pulse of substantially constant amplitude.

28. In a converter according to claim 26, said two series-connected reactors of said transductor assembly having different winding-turn ratios respectively.

29. In a converter according to claim 26, said excitation means of said two reactors of said transductor assembly comprising respective excitation windings inductively linked with said two latter reactors, said two excitation windings being series-connected with each other in said one premagnetizing circuit to be traversed by direct current from said source.

30. An electric contact converter, comprising alternating-voltage supply means, a converter circuit connected to said supply means and having a synchronous converter contact synchronous with said alternating-voltage supply means and a saturable commutating reactor series-connected with said contact for producing a current step near the current zero value, two premagnetizing means inductively linked with said reactor for jointly premagnetizing it during said step, a transductor having a main winding and a direct-current pre-excitation winding, a transductor circuit operative to provide a voltage synchronous with that of said supply means and comprising said main winding in series with one of said premagnetizing means, and a direct-current circuit comprising said pre-excitation winding in series with said other premagnetizing means.

31. An electric contact converter, comprising polyphase alternating-voltage supply means, a converter circuit having a plurality of sequentially operative phase circuits connected to said supply means and having synchronous converter contacts synchronous with said alternating-voltage supply means in said respective phase circuits, a commutating reactor for each of said respective contacts, each of said reactors having a saturable core and having on said core a main winding connected in series with said contact to provide a make-step interval and a break-step interval near the current zero passages at the beginning and end respectively of the conductive period of said contact, said reactor having a plurality of coactive premagnetizing means, a first one of said premagnetizing means having synchronous pulse-generating means, said pulse-generating means providing an alternating pulse having a substantially constant amplitude of one polarity during the operating time range available for said make-step interval and a substantially constant amplitude of the other polarity during the operating time range available for said break-step interval, and another one of said premagnetizing means having an asymmetrically conductive circuit member and resistance means series-connected with each other and providing during one of said two intervals a premagnetizing current variable in dependence upon the voltage at said reactor main winding, said two premagnetizing means having relative to said main winding a poling at which the magnetomotive forces produced in said core by said respective premagnetizing currents jointly oppose during said break-step interval the magnetomotive force caused by the flow of converter load current in said main winding.

32. In a converter according to claim 31, said pulse-generating means being operative to provide a higher pulse amplitude during said make-step range than during said break-step range to produce in said reactor core a magnetomotive force of alternatingly different direction and different magnitude.

33. In a converter according to claim 31, said pulse-generating means comprising a source of alternating voltage synchronous with the voltage of said supply means, a premagnetizing winding on said core of said commutating reactor, and a series transductor connected to said source in series with said premagnetizing winding.

34. In a converter according to claim 31, said first premagnetizing means comprising two premagnetizing circuits having respective premagnetizing windings on said core of said commutating reactor, one of said two premagnetizing circuits having a constant direct-current source, said pulse-generating means being connected in said other premagnetizing circuit, and said other premagnetizing circuit being operative to provide during each alternating-voltage cycle a temporary pulse current of substantially constant amplitude and of a magnitude at which the resulting magnetomotive force is larger than the opposing magnetomotive force caused in said core by said one premagnetizing circuit, so as to produce a resultant magnetomotive force of alternating direction.

35. In a converter according to claim 31, said first premagnetizing means comprising two premagnetizing circuits having respective premagnetizing windings on said core of said commutating reactor, one of said two premagnetizing circuits having a constant direct-current source, said pulse-generating means comprising a rectifier circuit anodically connected in said other premagnetizing circuit and being operative to provide during each alternating-voltage cycle a temporary pulse current of substantially constant amplitude and of a magnitude at which the resulting magnetomotive force is larger than the opposing magnetomotive force caused in said core by said one premagnetizing circuit, so as to produce a resultant magnetomotive force of alternating direction.

36. In a converter according to claim 31, said first premagnetizing means comprising two premagnetizing circuits having respective premagnetizing windings on said core of said commutating reactor, one of said two premagnetizing circuits having a constant direct-current source, said pulse-generating means comprising a source of alternating voltage synchronous with said supply means, a valve and a direct-current-excited saturable reactor series-connected with each other and connecting said alternating-voltage source with said other premagnetizing circuit, and said other premagnetizing circuit being operative to provide during each alternating-voltage cycle a temporary pulse current of substantially constant amplitude and of a magnitude at which the resulting magnetomotive force is larger than the opposing magnetomotive force caused in said core by said one premagnetizing circuit, so as to produce a resultant magnetomotive force of alternating direction.

37. An electric contact converter, comprising alternating-voltage supply means, a converter circuit connected to said supply means and having synchronous contact means synchronous with said alternating-voltage supply means and a saturable commutating reactor series-connected with said contact means for producing a make-step interval and a break-step interval near current zero at the beginning and end respectively of the conductive period of said contact, said reactor having a first premagnetizing circuit including a source of premagnetizing current of substantially constant amplitude for producing in said reactor a constant magnetomotive force during at least one of said two intervals, and said commutating reactor having another premagnetizing circuit of a magnetizing-current characteristic variable in dependence upon the voltage at said reactor for producing a correspondingly variable magnetomotive force during said make-step interval as well as during said break-step interval, said other premagnetizing circuit having ohmic resistance and being connected to the direct-current side of said contact and extending therefrom in parallel relation to a portion of said converter circuit, said portion including said contact and at least part of said reactor main winding.

38. An electric contact converter, comprising polyphase alternating voltage supply means, a converter circuit having a plurality of sequentially operative phase circuits connected to said supply means and having synchronous converted contacts synchronous with said alternating-voltage supply means in said respective phase circuits, a commutating reactor for each of said respective contacts, each of said reactors having a saturable core and having on said core a main winding connected in series with said contact to provide a make-step interval near the current zero value at the start of the closing period of said contact, said reactor having two coactive premagnetizing circuits, one of said premagnetizing circuits being operative to provide during said make-step interval a substantially invariable current, said other premagnetizing circuit being connected to the direct-current side of said contact and extending therefrom in parallel relation to a portion of said phase circuit including said contact and at least part of said reactor main winding so as to conduct a variable premagnetizing current dependent upon the voltage of said main winding, said other premagnetizing circuit having a controllable valve and resistor means series connected with each other, said valve having a control circuit for releasing said variable current, and an auxiliary contact disposed at said converter contact and operative to close shortly prior to the closing moment of said converter contact, and said valve having a control circuit connected to said auxiliary contact to be controlled thereby.

39. An electric contact converter, comprising alternating-voltage supply means, a converter circuit connected to said supply means and having synchronous contact means synchronous with said alternating-voltage supply means and a saturable commutating reactor series-connected with said contact means to provide alternately a make-step interval and a break-step interval near successive current zero values respectively, premagnetizing circuit means inductively linked with said reactor and operative to provide a premagnetizing current during at least one of said intervals, and additional premagnetizing circuit means conductively linked with said reactor for back-magnetizing said reactor, said additional premagnetizing circuit means including premagnetizing-current supply means of a temporary current duration commencing after said break-step interval and terminating prior to the next make-step interval of said converter contact.

40. In a polyphase converter according to claim 39, said additional premagnetizing circuit means for back-magnetizing said commutating reactor comprising an auxiliary premagnetizing winding inductively linked with said reactor, and a polyphase auxiliary transformer connected to said voltage-supply means and having a plurality of phase-sequential anode circuits, one of said anode circuits being connected with said auxiliary winding to supply it with current pulses.

41. In a converter according to claim 39, said additional premagnetizing circuit means comprising an auxiliary winding inductively linked with said reactor, and said current supply means comprising an alternating voltage source and having an asymmetrically conductive circuit device connected to said source in series with said auxiliary winding to supply unidirectional back-magnetizing pulses to said winding, and an adjustable resistor series connected with said circuit device and said auxiliary winding for varying the degree of back-magnetization.

42. An electric contact converter, comprising alternating-voltage supply means, a converter circuit connected to said supply means and including a synchronous converter contact synchronous with said alternating-voltage supply means, a commutating reactor having a saturable core of substantially rectangular hysteresis characteristic and having a main winding on said core series-connected in said converter circuit to produce a current-step interval for the break operation of said contact, premagnetizing circuit means inductively linked with said core for premagnetizing said reactor during said interval, said premagnetizing circuit means having a poling such that the premagnetizing magnetomotive force of said circuit means is opposed to that caused by the converter load current flowing in said main winding, back-magnetizing circuit means inductively linked with said core and having current supply means of a periodic current duration within a limited time interval commencing after said break-step interval and terminating prior to the next re-closing of said contact for producing a back-magnetizing magnetomotive force in said reactor, said back-step premagnetizing circuit means and said back-magnetizing circuit means being operative to provide within said limited time interval a resultant magnetomotitve force of the same direction as the magnetomotive force caused by said load current and of a higher magnitude than the magnetomotive force that corresponds to the static hysteresis characteristic of said core.

43. In a converter according to claim 42, said premagnetizing circuit means comprising two premagnetizing windings on said core of said commutating reactor, a first premagnetizing circuit having a voltage derived from that of said alternating-voltage supply means and including one of said premagnetizing windings and an asymmetrical series transductor connected in series with said latter winding to provide it with trapezoidal premagnetizing current of differently long positive and negative pulses respectively, said derived voltage having relative to said supply-means voltage a phase position at which the shorter one of said pulses coincides with said time interval for back-magnetization, said one premagnetizing winding having a poling such that the direction of the magnetomotive force due to said shorter pulse coincides with the direction of the magnetomotive force due to the converter load current and the direction of the magnetomotive force due to said longer pulse is opposed to the direction of the load-current magnetomotive force, and a second premagnetizing circuit including said other premagnetizing winding and having a stabilized direct-current supply, said second premagnetizing winding having the poling required for the magnetomotive force to oppose that produced by the load current.

44. In a converter according to claim 42, said back-magnetizing circuit means comprising pulse-generating means synchronous with said alternating-voltage supply means and having during said limited time interval a pulse-current polarity and amplitude corresponding to said magnetomotive-force direction and magnitude respectively.

45. An electric contact converter, comprising alternating-voltage supply means, a converter circuit connected to said supply means and having a synchronous converter contact synchronous with said alternating-voltage supply means, a commutating reactor having a saturable core and having a main winding on said core series-connected in said converter circuit to produce current-step intervals near current zero for make operation and break operation of said contact, premagnetizing circuit means inductively linked with said core for premagnetizing said reactor during said interval, said premagnetizing circuit means having during said break-step interval a poling such that the premagnetizing magnetomotive force of said circuit means is opposed to that caused by the converter load current flowing in said main winding, back-magnetizing circuit means inductively linked with said core and including current supply means of a periodic current duration within a limited time interval commencing after said break-step interval and terminating prior to the next make-step interval for producing a back-magnetizing magnetomotive force in said reactor, said premagnetizing means and said back-magnetizing means being operative to provide during said limited time interval respective cumulative magnetomotive forces of the same direction as the magnetomotive force caused by the load current and of a resultant magnitude higher than the magnetomotive force that corresponds to the static hysteresis characteristic of said core.

46. An electric contact converter, comprising alternating-voltage supply means, a converter circuit connected to said supply means and including a series connected synchronous converter contact synchronous with said alternating-voltage supply means, a commutating reactor having a saturable core and having a main winding on said core series-connected in said converter circuit to produce current-step intervals near current zero for make operation and break operation of said contact, premagnetizing means inductively linked with said core for premagnetizing said reactor during said intervals, back-magnetizing circuit means inductively linked with said core and including current supply means of a periodic current duration within a limited time interval commencing after said break-step interval and terminating prior to the next make-step interval for producing a back-magnetizing magnetomotive force in said reactor, said current-supply means including a source of alternating voltage synchronous with that of said alternating-voltage supply means and having a series transductor connected in series with said source, said premagnetizing means and said back-magnetizing means being operative to provide during said limited time interval respective cumulative magnetomotive forces of the same direction as the magnetomotive force caused by the load current and of a resultant magnitude higher than the magnetomotive force that corresponds to the static hysteresis characteristic of said core.

47. An electric contact converter, comprising alternating-voltage supply means, a converter circuit connected to said supply means and having a series connected synchronous converter contact synchronous with said alternating-voltage supply means, a commutating reactor having a main winding connected in said converter circuit in series with said contact, said reactor having a first saturable core inductively linked with said main winding to produce a break-step interval for the break operation of said contact, said reactor having a second saturable core of a substantially rectangular hysteresis characteristic also inductively linked with said main winding to produce a make-step interval for the make operation of said contact, make premagnetization means inductively linked with said second core for premagnetizing said second core during said make-step interval in the magnetizing direction of the load current flowing in said main winding, back-magnetizing circuit means inductively linked with said second core and including current supply means of a periodic current duration commencing after each break-step interval and terminating prior to the next make-step interval for producing during a limited time interval a back-magnetizing magnetomotive force in said second core, said make premagnetizing means and said back-magnetizing means being operative to provide in said second core during said limited interval a resultant magnetomotive force of a direction opposing that of the magnetomotive force caused by the load current and of a magnitude higher than corresponds to the static hysteresis value of said second core.

48. In a converter according to claim 47, said back magnetizing means of said second core comprising a pulse-generating circuit having during said limited time interval a pulse-current polarity and amplitude corresponding to said magnetomotive-force direction and magnitude respectively.

49. An electric contact converter, comprising alternating-voltage supply means, a converter circuit having a plurality of phase circuits connected to said supply means and having two direct-current buses of positive and negative polarities respectively, each of said phase circuits having a pair of synchronous contacts synchronous with said alternating-voltage supply means mutually phase opposed and connected to said buses respectively, each of said phase circuits having a saturable commutating reactor, said reactor having a main winding series connected with said pair of contacts for producing a current-step interval near the current zero value, two coactive premagnetizing circuits inductively linked with said reactor, one of said premagnetizing circuits being connected to said alternating-voltage supply means and being operative to provide a trapezoidal current for premagnetizing said reactor during one of said intervals by substantially constant current of one polarity and during the next interval by substantially constant current of the other polarity, whereby said one premagnetizing circuit produces in said reactor during each of said intervals a constant magnetomotive force, said other premagnetizing circuit being operative to provide during said intervals a current variable in response to the voltage at said reactor to produce in said reactor a variable magnetomotive force, said two premagnetizing circuits having a poling such that said respective magnetomotive forces are cumulative during said intervals.

50. In a converter according to claim 49, comprising a transductor series connected in said one premagnetizing circuit, said transductor having two series-connected saturable reactors, and said latter reactors having opposingly related direct-current excitation means respectively.

References Cited in the file of this patent or the original patent

UNITED STATES PATENTS

| | | |
|---|---|---|
| 2,351,975 | Koppelmann | June 20, 1944 |
| 2,466,864 | Prati | Apr. 13, 1949 |
| 2,557,739 | Goldstein et al. | June 19, 1951 |
| 2,568,140 | Belamin | Sept. 18, 1951 |
| 2,584,535 | Belamin | Feb. 5, 1952 |

FOREIGN PATENTS

| | | |
|---|---|---|
| 356,916 | Italy | Feb. 22, 1938 |
| 961,741 | France | May 19, 1950 |